(12) United States Patent
Fujii

(10) Patent No.: US 7,259,677 B2
(45) Date of Patent: Aug. 21, 2007

(54) IC-TAG READ-WRITE APPARATUS

(75) Inventor: Tatsuya Fujii, Hyougo (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 11/020,627

(22) Filed: Dec. 23, 2004

(65) Prior Publication Data

US 2005/0156742 A1    Jul. 21, 2005

(30) Foreign Application Priority Data

Dec. 26, 2003 (JP) ............................ 2003-433789
Dec. 10, 2004 (JP) ............................ 2004-357927

(51) Int. Cl.
*G08B 13/14* (2006.01)

(52) U.S. Cl. ................ 340/572.7; 374/572.1; 455/41.1; 455/41.2; 455/73

(58) Field of Classification Search ............ 340/572.1, 340/573.7, 572.8; 455/41.1, 41.2, 41.3, 41.7
See application file for complete search history.

(56) References Cited

U.S. PATENT DOCUMENTS 5,640,151 A * 6/1997 Reis et al. .................. 340/10.2

7,005,968 B1 * 2/2006 Bridgelall ................ 340/10.42

FOREIGN PATENT DOCUMENTS

| JP | 7-200749 | 8/1995 |
| JP | 2002-259921 | 9/2002 |

* cited by examiner

Primary Examiner—Jeffery Hofsass
Assistant Examiner—Hongmin Fan
(74) Attorney, Agent, or Firm—Cooper & Dunham LLP

(57) ABSTRACT

A radio data communication apparatus includes a circuit unit and at least one antenna unit. The circuit unit performs data read and write operations relative to an IC tag. Each antenna unit has an antenna and conducts a predetermined signal modulation to a first signal to be transmitted through the antenna by radio transmission to a specific IC tag in the data write operation. Also, each antenna unit conducts a predetermined signal demodulation to a second signal received through the antenna from the specific IC tag in accordance with the data read operation. The antenna unit is arranged at a position separated from the circuit unit.

36 Claims, 16 Drawing Sheets

IC-TAG READ-WRITE APPARATUS

BACKGROUND

1. Field

The present specification describes a method and apparatus for image forming, and more particularly to a method and apparatus for image forming that is capable of performing a stable sheet transfer operation.

2. Discussion of the Background

A typical structure of a background IC (integrated circuit) tag read-and-write apparatus 100 is illustrated in FIG. 1. The background IC-tag read-and-write apparatus 100 communicates with an IC tag 110 by performing by radio communication a data read and write operation relative to the IC tag 110. The background IC-tag read-write apparatus 100 includes an antenna ANTa and a circuit unit 105 which includes an oscillating circuit (OSC) 101, a controlling circuit (CONT) 102, and a signal modulating circuit (MOD) 103. The IC tag 110 of FIG. 1 includes an antenna ANTb and a signal modulating circuit (MOD) 111.

The oscillating circuit 101 generates and outputs a carrier wave to perform a radio communication with the IC tag 110. The controlling circuit 102 performs an input and output control of a data signal to be superimposed on the carrier wave output from the oscillating circuit 101. The signal modulation circuit 103 receives the carrier wave and data signal output from the controlling circuit 102 and conducts a signal modulation to the carrier wave in accordance with the data signal. The modulated signal is transmitted by radio transmission through the antenna ANTa. The IC tag 110 receives the radio signal sent from the IC-tag read-write apparatus 100 and demodulates the received signal with the signal modulation circuit 111.

To read data from the IC tag 110, the IC-tag read-write apparatus 100 sends a read command to the IC tag 110. Upon receiving such a read command, the IC tag 110 modulates the carrier wave with the signal modulation circuit 111, sends the data requested by the read command from the IC-tag read-write apparatus 100, and transmits by radio transmission the carrier wave together with the requested data through the antenna ANTb. The IC-tag read-write apparatus 100 receive the radio signal with the antenna ANTa, demodulates the received signal, and retrieves the data requested.

In the background IC-tag read-write apparatus 100, the circuit unit 5 including the oscillating circuit 101, the controlling circuit 102, and the signal modulation circuit 103 is integrated into at least one IC (integrated circuit) chip. In some cases, the circuit unit 105 is integrated with the antenna ANTa. In some cases, the circuit unit 105 is connected with the antenna ANTa with a cable.

SUMMARY

This patent specification describes a novel radio data communication apparatus. In one example, a novel radio data communication apparatus includes a circuit unit and at least one antenna unit. The circuit unit is configured to perform data read and write operations relative to an IC tag. Each antenna unit is configured to have an antenna and to conduct a predetermined signal modulation to a first signal to be transmitted through the antenna by radio transmission to a specific IC tag in the data write operation and a predetermined signal demodulation to a second signal received through the antenna from the specific IC tag in accordance with the data read operation. The antenna unit is arranged at a position separated from the circuit unit.

The radio data communication apparatus may further include a signal transmitter configured to transmit signals between the circuit unit and the antenna unit. In this apparatus, the circuit unit outputs a data signal and a carrier wave together included in the first signal to the antenna unit in the data write operation and retrieves data from the second signal after the predetermined signal demodulation performed by the antenna unit in the data read operation.

The antenna unit may include an antenna configured to transmit the first signal and receive the second signal and a signal modulation circuit configured to modulate the carrier wave and the data signal with the predetermined signal modulation to generate the first signal to be transmitted through the antenna in the data write operation and to demodulate the second signal received through the antenna in the data read operation.

The circuit unit may further include an oscillating circuit configured to generate the carrier wave having a specific frequency and a control circuit configured to synchronize the carrier wave and the data signal and to output the carrier wave and the data signal in synchronism with each other to the signal modulation circuit of the antenna unit.

The circuit unit may further include an oscillating circuit configured to generate a plurality of carrier waves having specific frequencies different from each other, a switch circuit configured to exclusively select a specific carrier wave from among the plurality of carrier waves output from the oscillating circuit, and a control circuit configured to synchronize the specific carrier wave output from the switch circuit and the data signal and to output the carrier wave and the data signal in synchronism with each other to the signal modulation circuit of the antenna unit. In this apparatus, the specific carrier wave has a frequency previously set in accordance with a kind of a particular IC tag with which the radio data communication apparatus starts communicating, and the control circuit instructs the switch circuit to exclusively select the specific carrier wave from among the plurality of carrier waves to communicate with the particular IC card.

The antenna unit may include an antenna configured to transmit the first signal and receive the second signal, a frequency multiplication circuit configured to multiply at a predetermined multiplication ratio a frequency of the carrier wave transmitted together with the data signal from the circuit unit, and a signal modulation circuit configured to modulate the carrier wave output from the frequency multiplication circuit and the data signal with the predetermined signal modulation to generate the first signal to be transmitted through the antenna in the data write operation and to demodulate the second signal received through the antenna in the data read operation.

The frequency multiplication circuit may include an oscillating circuit configured to multiply at the predetermined multiplication ratio the frequency of the carrier wave input from the circuit unit and to output a signal having the multiplied frequency, a frequency division circuit configured to divide the frequency of the signal output from the oscillating circuit of the antenna unit, and a phase comparison circuit configured to compare a phase of a signal output from the frequency division circuit with a phase of the carrier wave input from the circuit unit and to output a phase comparison signal representing a result of phase comparison. In this apparatus, the oscillating circuit is configured to adjust the multiplied frequency of the signal output therefrom based on the phase comparison signal such that the phase of the carrier wave output from the circuit unit matches the phase of the frequency division circuit.

The frequency multiplication circuit may include a phase locked loop circuit configured to multiply at a predetermined multiplication ratio the frequency of the carrier wave input from the circuit unit.

The circuit unit is further configure to transmit the carrier wave having a predetermined frequency to the frequency multiplication circuit and the data signal to the signal modulation circuit in the data write operation, and to retrieve data from a signal demodulated by the signal modulation circuit of the antenna unit in the data read operation.

The circuit unit may include an oscillating circuit configured to generate the carrier wave having a specific frequency and a control circuit configured to synchronize the carrier wave output from the oscillating circuit and the data signal and to transmit the carrier wave to the frequency multiplication circuit and the data signal to the signal modulation circuit.

The antenna unit may include an antenna configured to transmit the first signal and receive the second signal, an oscillating circuit configured to generate the carrier wave having a specific frequency, and a signal modulation circuit configured to modulate the carrier wave output from the oscillating circuit and the data signal with the predetermined signal modulation to generate the first signal to be transmitted through the antenna in the data write operation and to demodulate the second signal received through the antenna in the data read operation.

The antenna unit may further include a signal generating circuit configured to divide the frequency of the signal output from the oscillating circuit and to transmit the signal having the divided frequency to the control circuit of the circuit unit through the signal transmitter. In this apparatus, the control circuit is configured to synchronize the data signal and the signal from the signal generating circuit and to output the synchronized signals to the signal modulation circuit of the antenna unit.

The signal generating circuit may be configured to divide the frequency of the signal output from the oscillating circuit at a predetermined frequency division ratio.

The signal transmitter may include a signal transmission path for transmitting a signal.

Each of the antenna unit and the circuit unit may include a communication interface circuit for interfacing signal communications between the antenna unit and the circuit unit through the signal transmitter.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
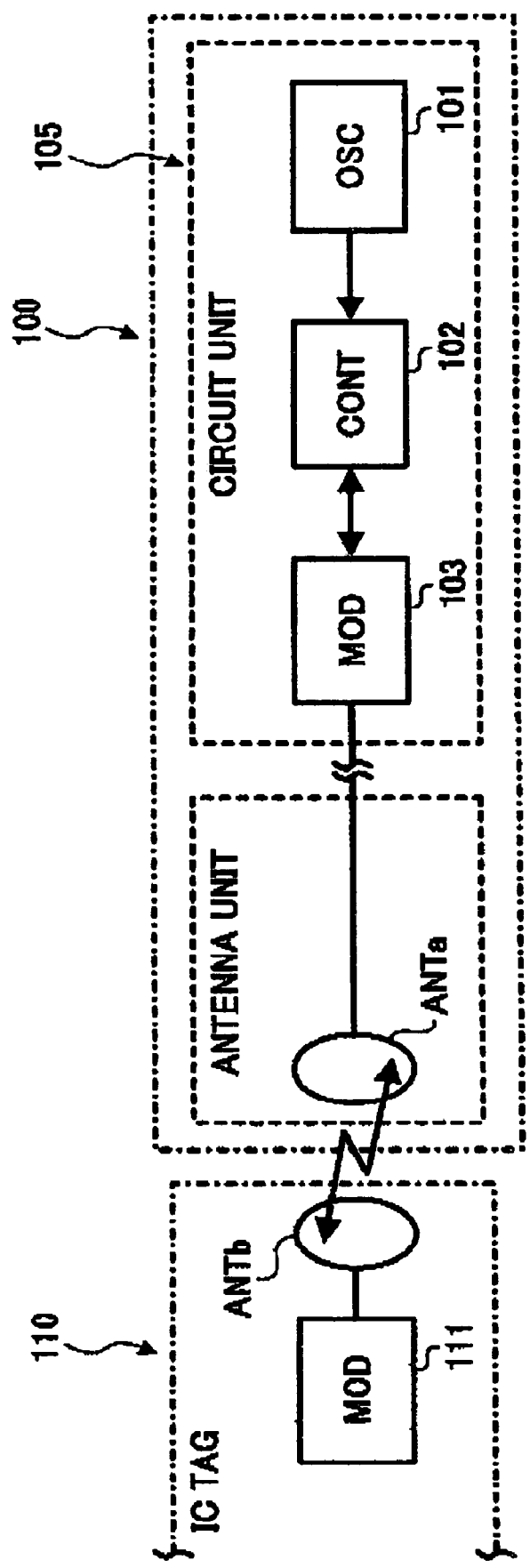
FIG. 1 is an illustration of a background IC-tag read-write apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, an IC (integrated circuit) tag reader writer apparatus 1 according to an exemplary embodiment is explained.

Figure 2:
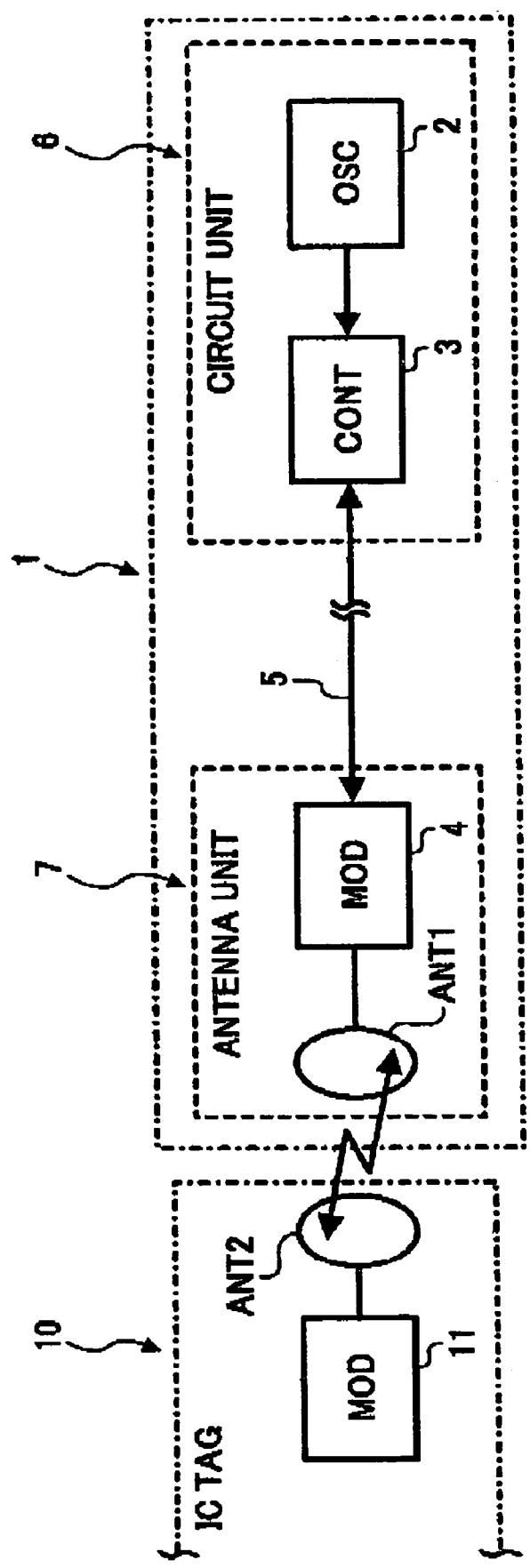
FIG. 2 is an illustration of an IC-tag read-write apparatus according to an embodiment of this disclosure.

In FIG. 2, the IC-tag read-write apparatus 1 includes an oscillator (OSC) 2, a controller (CONT) 3, a modulation circuit (MOD) 4, an antenna ANT1, and a transmission path 5. FIG. 2 also illustrates an IC (integrated circuit) tag 10 which includes a modulation circuit (MOD) 11 and an antenna ANT2.

In the IC-tag read-write apparatus 1 of FIG. 2, the oscillator 2 generates a carrier wave having a predetermined frequency. The controller 3 controls input and output of data signals to be superimposed on the carrier wave output from the oscillator 2. The oscillator 2 and the controller 3 form an integrated circuit unit 6 including at least one integrated circuit chip. The antenna ANT1 and the modulation circuit 4 form a unified part referred to as an antenna unit 7.

As illustrated in FIG. 2, the oscillator 2 is connected to the controller 3 in the circuit unit 6 and the antenna ANT1 is connected to the modulation circuit 4 in the antenna unit 7. The controller 3 and the modulation circuit 4 exchange signals with each other via the transmission path 5. The transmission path 5 may be a wiring line or wireless path using infrared rays, for example. The oscillator 2 generates and outputs the carrier wave for wireless communications with the IC tag 10. The carrier wave for this purpose generally has a frequency of 13.56 MHz. Some cases, however, may use a relatively low frequency such as in the range or from 120 kHz to 500 kHz or an ultrahigh frequency such as 900 MHz and 2.45 GHz, depending upon communication applications.

The controller 3 controls input and output of a data signal representing a signal to be superimposed on the carrier wave output from the oscillator 2. The modulation circuit 4 performs a predetermined modulation to the carrier wave and the data signal, input from the controller 3 via the transmission path 5, and outputs a resultant modulated signal to the antenna ANT1. On the other hand, the modulation circuit 4 performs a predetermined demodulation to a signal received from outside via the antenna ANT1 and outputs a resultant demodulated signal to the controller 3 via the transmission path 5.

In the IC tag 10, the antenna ANT2 is connected to the modulation circuit 11, as illustrated in FIG. 2.

The above-described IC-tag read-write apparatus 1 writes data to the IC tag 10 in the following way. The controller 3 outputs the carrier wave generated by the oscillator 2 and the data signal representing a signal to be superimposed on the carrier wave, in synchronism with each other to the modulation circuit 4. Upon receiving the carrier wave and the data signal from the controller 3, the modulation circuit 4 performs the predetermined modulation to the carrier wave and the data signal in accordance with the data and outputs the resultant modulated signal to the antenna ANT1. The antenna ANT1 transmits the modulated signal by radio waves. The IC tag 10 receives the radio waves thus transmitted from the IC-tag read-write apparatus 1 with the antenna ANT2 and demodulates the received signal with the modulation circuit 11.

To read data from the IC tag 10, the IC-tag read-write apparatus 1 conducts the following operations. When the IC tag 10 receives read command data sent from the IC-tag read-write apparatus 1, the IC tag 10 demodulates the carrier wave and the data signal to be read by the IC-tag read-write apparatus 1 with the modulation circuit 11 and transmits the modulated signal from the antenna ANT2 by radio waves. The IC-tag read-write apparatus 1 receives with the antenna ANT1 the radio waves sent from the antenna ANT2 and demodulates the received signal with the modulation circuit 4. Then, the controller 3 of the IC-tag read-write apparatus 1 extracts the requested data from the received signal.

In the configuration of the IC-tag read-write apparatus 1, the circuit unit 6 and the antenna unit 7 are physically separated, and the controller 3 of the circuit unit 6 and the modulation circuit 4 of the antenna unit 7 are connected with the transmission path 5. Therefore, the position of the antenna ANT1 is flexible. In a case the modulation circuit 4 is formed in an integrated circuit, it can be sufficiently smaller than the antenna ANT1 so as to be located as a part of the antenna ANT1. In this case, the modulation circuit 4 itself would have little effect on the positioning of the antenna ANT1.

As described above, the carrier wave and the data signal are separated and not in a superimposed state in an area between the controller 3 and the modulation circuit 4. This makes it possible to provide a length of the transmission path 5 longer than a line between the antenna ANT1 and the modulation circuit 4. Accordingly, in a system containing the IC-tag read-write apparatus 1, the circuit unit 6 and the antenna unit 7 can be located in a flexible manner, so that the system can have a relatively compact size.

As an alternative, the controller 3 is arranged in the antenna unit 7 and is configured to be connected to the oscillator 2 through the transmission path 5.

Figure 3:
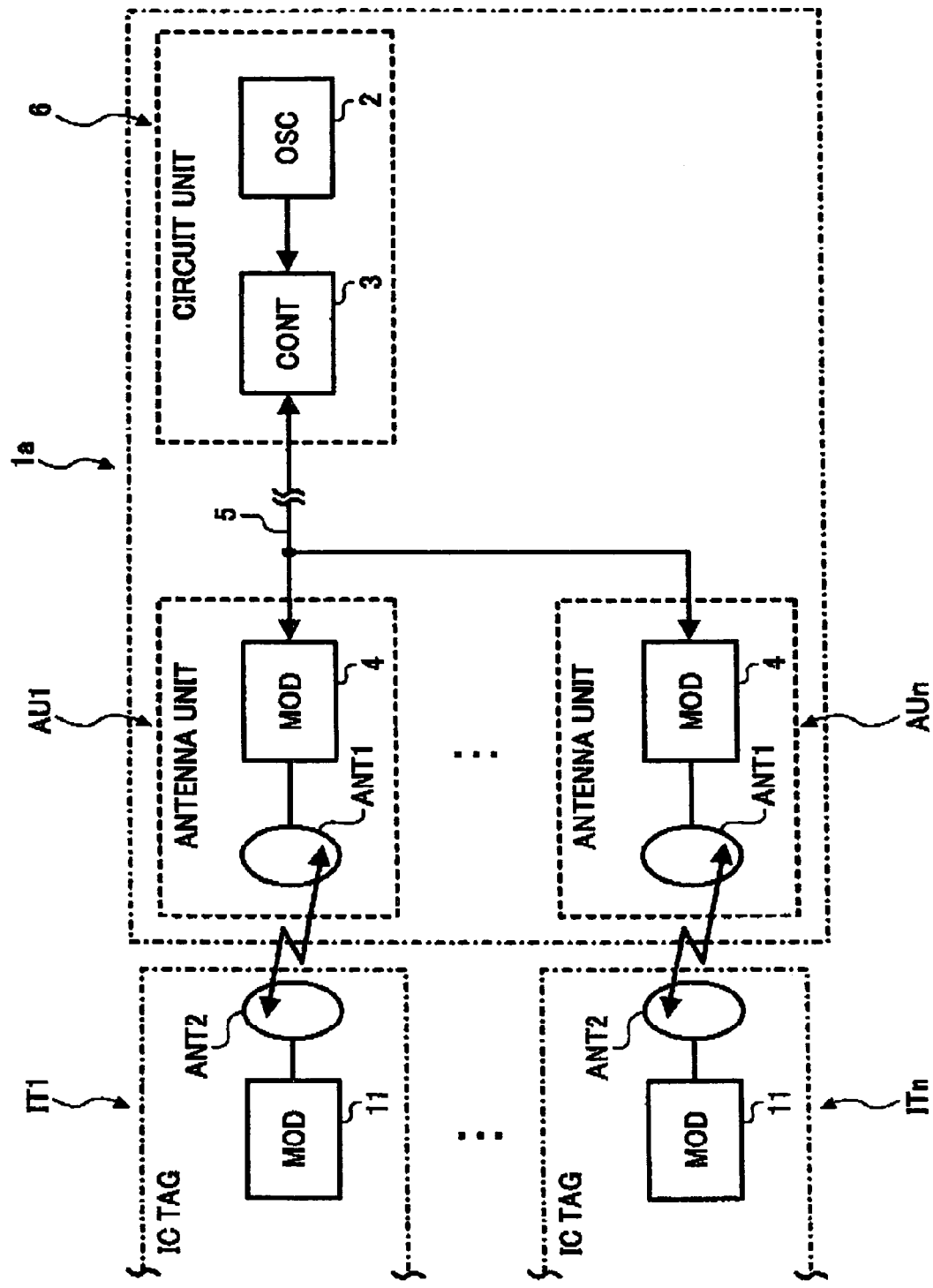
FIGS. 3 and 4 are illustrations of IC-tag read-write apparatuses according to other embodiments which communicate with a plurality of IC tags.

FIG. 3 illustrates an IC-tag read-write apparatus 1a according to another embodiment and also a plurality of IC tags IT1-ITn. As illustrated in FIG. 3, the IC-tag read-write apparatus 1a includes a plurality of antenna units AU1-AUn, in which n is a positive integer greater than 1. Each one of the antenna units AU1-AUn is equivalent to the antenna unit 7 of FIG. 2, and each one of the IC tags IT1-ITn is equivalent to the IC tag 10 of FIG. 2. The antenna units AU1-AUn are operative in combination with the respective IC tags IT1-ITn on a one-to-one basis. Each of the antenna units AU1-AUn is connected to the controller 3 via the transmission path 5. The IC-tag read-write apparatus 1a performs the data read and write operation basically in the same manner as the IC-tag read-write apparatus 1.

Figure 4:
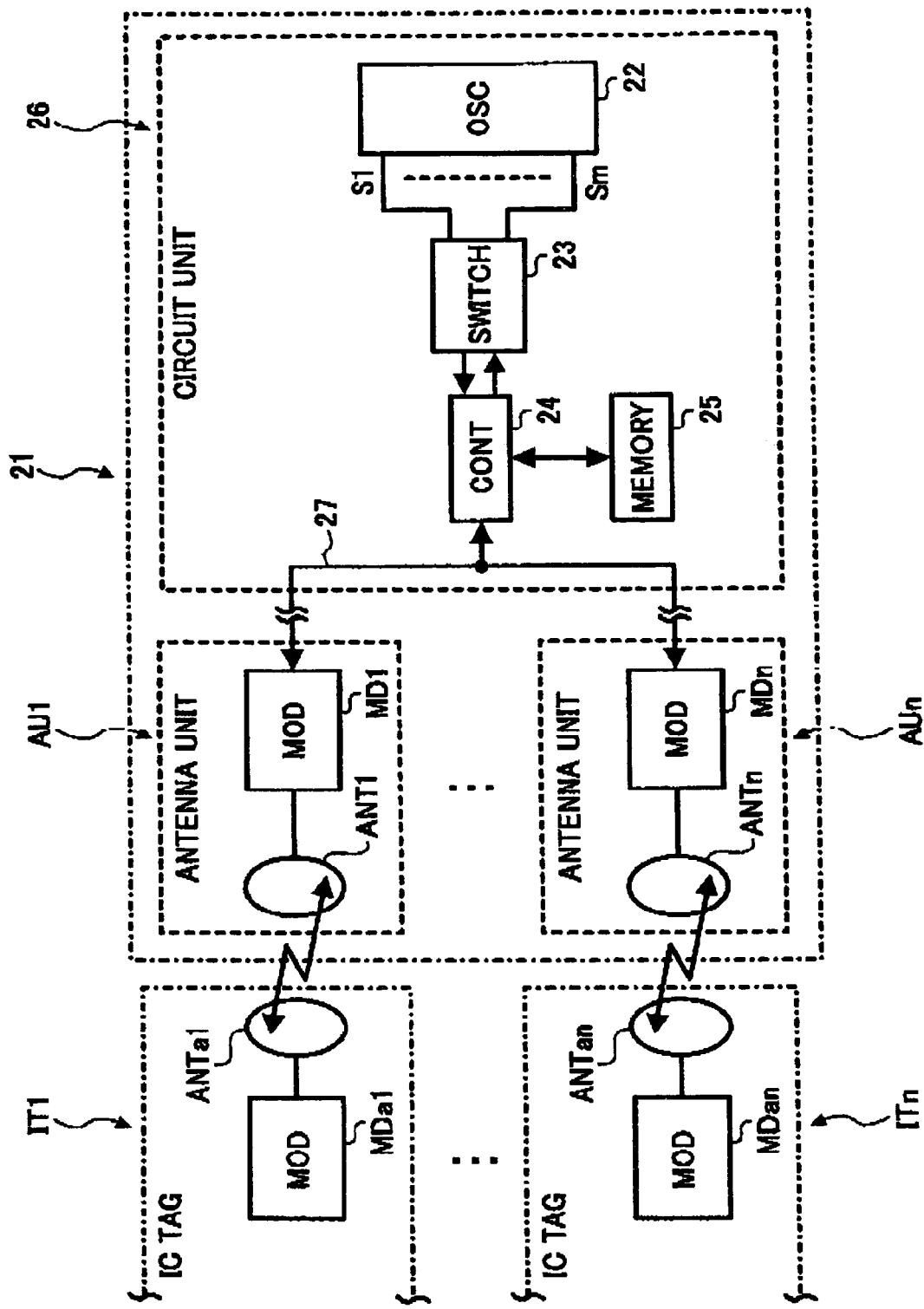

Referring to FIG. 4, an IC read write apparatus 21 according to another is explained. FIG. 4 illustrates the IC read write apparatus 21 which includes an oscillator (OSC) 22, a switch circuit (SWITCH) 23, a controller 24, a memory 25, a transmission path 27, a plurality of modulation circuits (MOD) MD1-MDn, and a plurality of antennas ANT1-ANTn. Each one of the modulation circuits MD1-MDn is equivalent to the modulation circuit 4, and each one of the antennas ANT1-ANTn is equivalent to the antenna unit ANT1. FIG. 4 further illustrates a plurality of IC tags IT1-ITn.

The oscillator 22 generates a plurality of carrier waves having predetermined frequencies different from each other. The switch circuit 23 selectively outputs one of the carrier waves output from the oscillator 22 in accordance with a control signal input from the controller 24. The controller 24 controls the switching operation of the switch circuit 23 by the control signal, and also controls input and output of the data signal to be superimposed on the carrier wave.

The oscillator 22, the switch circuit 23, the controller 24, and the memory 25 form an integrated circuit unit 26 including at least one integrated circuit chip. One of the antennas ANT1-ANTn and a corresponding one of the modulation circuits MD1-MDn form a corresponding one of the antenna units AU1-AUn. Namely, an antenna ANTk and a corresponding modulation circuit MDk form a corresponding antenna unit Auk, in which k is a positive integer variable in the range of 1 to n.

The oscillator 22 generates and outputs carrier waves S1-Sm having frequencies F1-Fm, respectively, to the switch circuit 23. The switch circuit 23 exclusively selects one of the carrier waves S1-Sm, output from the oscillator 22, in accordance with the control signal received from the controller 24 and outputs the selected carrier wave to the controller 24, in which m is a positive integer greater than 1 and equal to or smaller than n. The memory 25 stores data representing parameters including communication frequencies and communication protocols pertinent to the IC tags IT1-ITn. The controller 24 selects one of the carrier waves based on the data stored in the memory, and controls the switch circuit 23 to output the selected carrier wave.

Each of the modulation circuits MD1-MDn receives the carrier wave and the data signal, output from the controller 24, via the transmission path 27, performs a predetermined modulation to the carrier wave in accordance with the data signal, and sends the modulated signal to the corresponding antenna. The transmission path 27 may be a wiring line or wireless path using infrared rays, for example.

On the other hand, each of the modulation circuits MD1-MDn performs a predetermined demodulation to a signal received from outside via the corresponding antenna out of the antennas ANT1-ANTn and outputs a resultant demodulated signal to the controller 24 via the transmission path 27. The controller 24 extracts the desired data from the demodulated signal.

The IC tags IT1-ITn include antennas ANTa1-ANTan, respectively, and modulation circuits MDa1-MDan, respectively. Each of the antennas ANTa1-ANTan is arranged at a position relatively close to the corresponding one of the antennas ANT1-ANTn included in the corresponding one of the antenna units AU1-AUn. The antenna ANTk and the antenna ANTak have a resonance frequency which is set to a common frequency k. In this respect, the IC tag ITk is basically the one communicating with the IC-tag read-write apparatus 21 via the antenna ANTk.

However, it is possible that more than one antenna of the IC tag side can be disposed in the vicinity of one antenna of the IC-tag read-write apparatus side. Thus, it becomes possible that a pair of the modulation circuit and the antenna in the antenna unit of the IC-tag read-write apparatus side communicates with the number of IC tags, when the IC tags allows the communications with the same frequency.

In communications of the IC-tag read-write apparatus 21 with the IC tag ITk, the controller 24 reads data stored in the memory 25 for the resonance frequency of the IC tag ITk and sends the read data to the switch circuit 23. The switch circuit 23 selects a carrier wave having a frequency in accordance with such data sent from the controller 24 and sends the selected carrier wave to the controller 24. The controller 24 further reads from the memory 25 the communication protocols data for selecting the IC tag ITk and data representing the communications protocols, and sends the input carrier wave together with the read data to the modulation circuit MDk.

The modulation circuit MDk performs the predetermined modulation to the carrier wave in accordance with the data signal and sends the resultant signal to the antenna ANTk. The signal thus transmitted by radio waves from the antenna ANTk is received by the antenna ANTak of the IC tag ITk, and the received signal is demodulated by the modulation circuit MDak.

It is possible to configure the controller 24 to prohibit any other different antenna from transmitting by radio transmission a carrier wave having the frequency same as the one transmitted from the antenna ANTk.

In a case the controller 24 does not have such a prohibition function as described above, the signal sent to the modulation circuit MDk may also be sent to another modulation circuit in the IC-tag read-write apparatus 1 and accordingly the carrier wave having the frequency K may be transmitted by radio transmission from another antenna which is different from the antenna ANTk. However, the resonance frequency of such other antenna is not the frequency k and therefore the radio waves transmitted from an antenna other than the antenna ANTk is weak for radio communication.

Further, the antennas ANTa1-ANTan are in a similar situation. Namely, the resonance frequencies of antennas other than the ANTak are not the frequency k and therefore the radio waves transmitted from other antennas than the antenna ANTak are weak for radio communications.

In order to communicate with an IC tag other than the IC tag ITk (e.g., the IC tag IT2), the controller 24 instructs the switch circuit 23 to select the carrier wave S2 having the second frequency corresponding to the IC tag IT2. After the selection, the controller 24 sends the requisite data stored in the memory 25 together with the carrier wave S2 of the second frequency to the modulation circuit MD2 via the transmission path 27. The requisite data represents parameters including the selection data and the communication protocols pertinent to the IC tag IT2. Thus, the IC-tag read-write apparatus 21 achieves the communications with a selected IC tag, i.e., the IC tag IT2. In this way, the IC-tag read-write apparatus 21 can selectively communicate with any one of the IC tags ITa1-ITan.

Since the communications rate between the IC tag and the IC-tag read-write apparatus is increased with an increase of carrier wave frequency, it is preferable to change the frequency used for communications between the IC tag and the IC-tag read-write apparatus in accordance with the environmental factors surrounding the IC tag or a required communications frequency.

When the place for mounting the IC tag has a metal or conductive surface, it is preferable to use a low frequency in the range of from 120 kHz to 500 kHz, which is insusceptible to such material. On the other hand, when the IC tag is mounted on a place of a nonmetal or electrical insulating material, it is preferable to use a high frequency such as 13.56 MHz which allows a high speed communication.

It is also possible to use the frequency such as 900 kHz and 2.4 GHz depending upon the required communications speed and the environments with respect to the place for mounting the IC tag.

Figure 5:
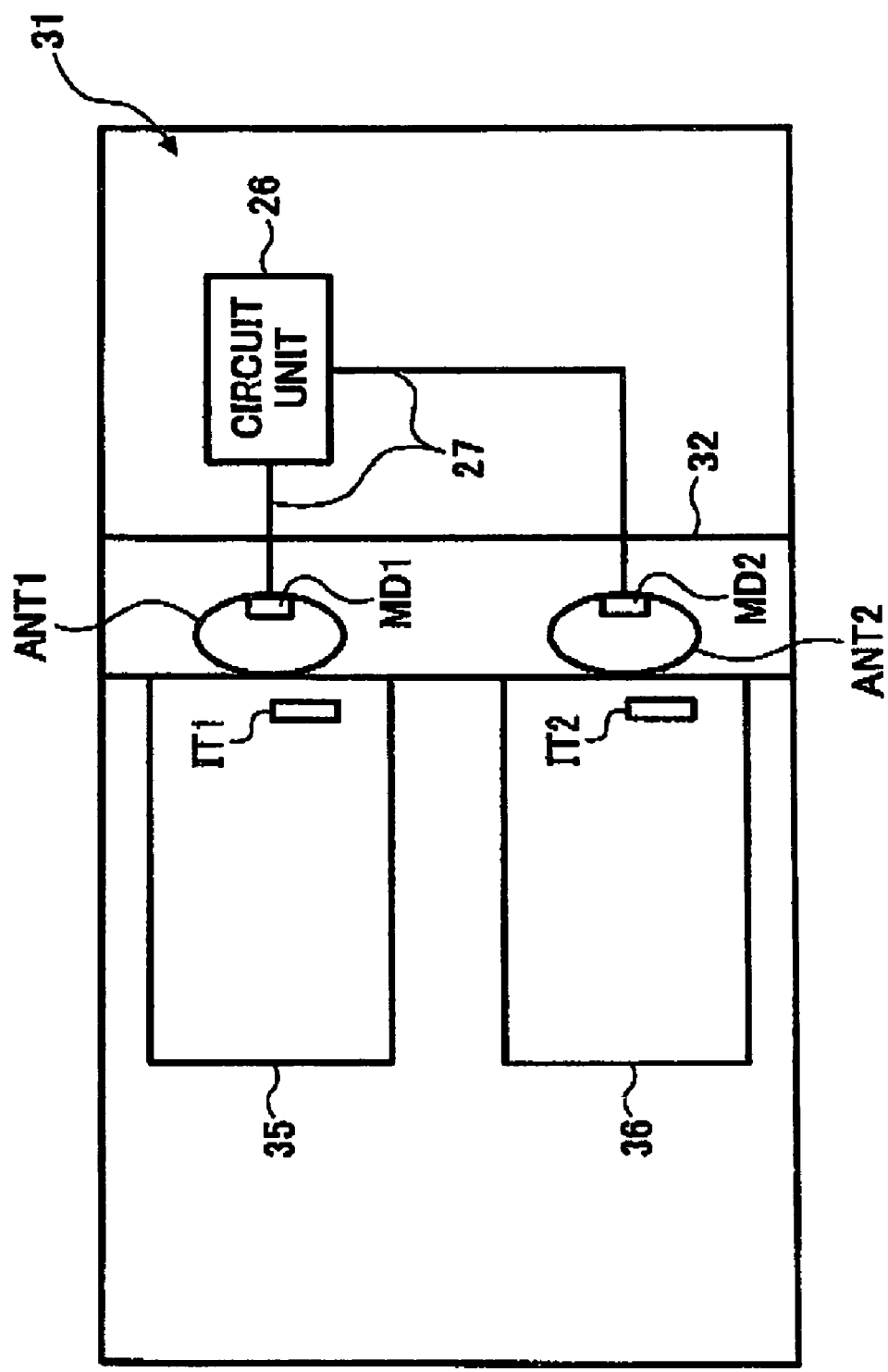
FIG. 5 is an illustration of an apparatus containing an IC-tag read-write apparatus according to another embodiment.

FIG. 5 illustrates in part an exemplary apparatus 31 which applies the radio communications using the IC-tag read-write apparatus 21. The apparatus 31 can be a digital copier, a printer, or the like capable of performing radio communications using the IC-tag read-write apparatus 21.

As illustrated in FIG. 5, the apparatus 31 includes a mounting member 32 and two components 35 and 36. It is possible to provide more components than the two components 35 and 36. The components 35 and 36 are those having status parameters varying over time, such as toner containers, for example. Status parameters of the components 35 and 36 which vary over time include a remaining amount of toner in the toner container, for example. These status parameters are needed to be monitored to maintain the apparatus 31 in an operable condition. To monitor the parameters, the IC tags IT1 and IT2 are fixed to the components 35 and 36, respectively, and the IC-tag read-write apparatus 21 is arranged to receive information of the status parameters of the components 35 and 36 through the IC tags IT1 and IT2 via radio communications.

As illustrated in FIG. 5, the component 35 is mounted on the mounting member 32 and the position of the IC tag IT1 fixed to the component 35 is preferably close to the mounting member 32. The antenna ANT1 of the IC-tag read-write apparatus 21 communicating with the IC tag IT1 is fixed to the mounting member 32 at a place as close as possible to the IC tag IT1. In a similar manner, the IC tag IT2 and the antenna ANT2 of the IC-tag read-write apparatus 31 are mounted on the component 36 and the mounting member 32, respectively.

When the components 35 and 36 are made of a nonmetal or electrical insulating material, the IC-tag read-write apparatus 21 can select a relatively high frequency such as 13.56 MHz or the like as the first frequency for the communication with the IC tags IT1 and IT2 so as to perform a high speed data transmission. When the components 35 and 36 are made of a metal or conductive material, a relatively low frequency insusceptible to such a metal or conductive material is selected in the range of from 120 kHz to 500 kHz. It is further possible to use other frequency than the above, such as 900 kHz, for example, depending upon a situation required based on the material of the components 35 and 36 and the communication speed.

In the apparatus 31, the antenna units of the IC-tag read-write apparatus 21 are mounted closer to the respective IC tags, as described above. Accordingly, in some cases, the circuit unit 26 of the IC-tag read-write apparatus 21 is positioned at relatively long distances from the antenna units. Even in these cases, it is possible to properly perform the communications between the circuit unit 26 and the antenna units AU1 and AU2 by a structure with integration of the modulation circuits MD1 and MD2 with the antennas ANT1 and ANT2, respectively, as illustrated in FIG. 5. Such an integration increases the flexibility in the locations of the components 35 and 36 and helps reduce the size of the apparatus 31.

As an alternative to the use of the IC-tag read-write apparatus 21 by the apparatus 31 which can be a digital copier, a printer, or the like, it is possible to efficiently use also other IC-tag read-write apparatuses such as the IC-tag read-write apparatuses 1 and 1a. In FIG. 5, in the case of using the IC-tag read-write apparatus 1 of FIG. 2, the circuit unit 6 of FIG. 2 replaces the circuit unit 26, the transmission path 5 of FIG. 2 replaces the transmission path 27, the modulation circuit 4 of FIG. 2 replaces the modulation circuit MD1, and the IC tag 10 of FIG. 2 replaces the IC tag IT1. In addition, in FIG. 5, the antenna ANT2, the IC tag IT2, and the modulation circuit MD2 are eliminated. Similarly, in the case of using the IC-tag read-write apparatus 1a of FIG. 3, the circuit unit 6 of FIG. 3 replaces the circuit unit 26, the transmission path 5 of FIG. 2 replaces the transmission path 27, and the modulation circuit 4 of FIG. 2 replaces the modulation circuits MD1 and MD2.

Figure 6:
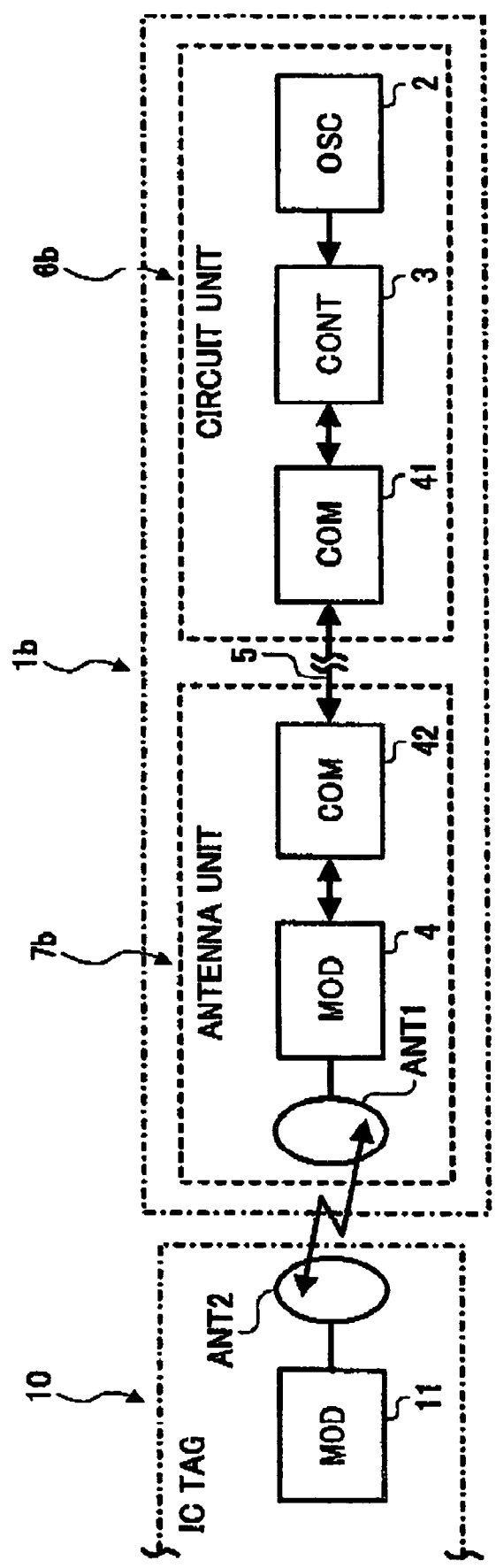
FIGS. 6-8 are illustrations of IC-tag read-write apparatuses according to other embodiments which include communication interface circuits between a circuit unit and an antenna unit.

Referring to FIG. 6, an IC-tag read-write apparatus 1b according to another embodiment is explained. The IC-tag read-write apparatus 1b of FIG. 6 is similar to the IC-tag read-write apparatus 1 of FIG. 2, except for communication interface circuits (COM) 41 and 42 provided to a circuit unit 6b and an antenna unit 7b, respectively.

In the IC-tag read-write apparatus 1b of FIG. 6, the circuit unit 6b includes the oscillator 2, the controller 3, and the communication interface circuit 41. The antenna unit 7b includes the communication interface circuit 42, the modulation circuit 4, and the antenna ANT1.

As illustrated in FIG. 6, the communication interface circuit 41 is connected to the controller 3 in the circuit unit 6b and the communication interface circuit 42 is connected to the modulation circuit 4 in the antenna unit 7b. The communication interface circuits 41 and 42 communicate with each other via the transmission path 5. The modulation circuit 4 receives the carrier wave and the data signal through the communication interface circuits 41 and 42 from the controller 3 and performs the predetermined modulation to the carrier wave and the data signal. The modulated signal is transmitted from the antenna ANT1 by radio transmission. The modulation circuit 4 also performs the predetermined demodulation to the signal received through the antenna ANT1, thereby obtaining a data signal. The data signal is sent to the controller 3 through the communication interface circuits 41 and 42 and the transmission path 5.

With the structure described above, the IC-tag read-write apparatus 1b can conduct serial communications in a steady manner between the circuit unit 6b and the antenna unit 7b.

As an alternative, it is possible to dispose the controller 3 inside the antenna unit and to connect the oscillator 2 to the controller 3 with the communication interface circuits 41 and 42 using the transmission path 5.

This IC-tag read-write apparatus 1b of FIG. 6 can also be efficiently used in the apparatus 31 of FIG. 5, which can be a digital copier, a printer, or the like, as an alternative to the IC-tag read-write apparatus 21 of FIG. 4. In this case, in FIG. 5, the circuit unit 6b of FIG. 6 replaces the circuit unit 26, the transmission path 5 of FIG. 6 replaces the transmission path 27, the combination of the modulation circuit 4 and the communication interface circuit 42 of FIG. 6 replaces the modulation circuit MD1, and the IC tag 10 of FIG. 6 replaces the IC tag IT1. In addition, in FIG. 5, the antenna unit ANT2, the IC tag IT2, and the modulation circuit MD2 are eliminated.

Figure 7:
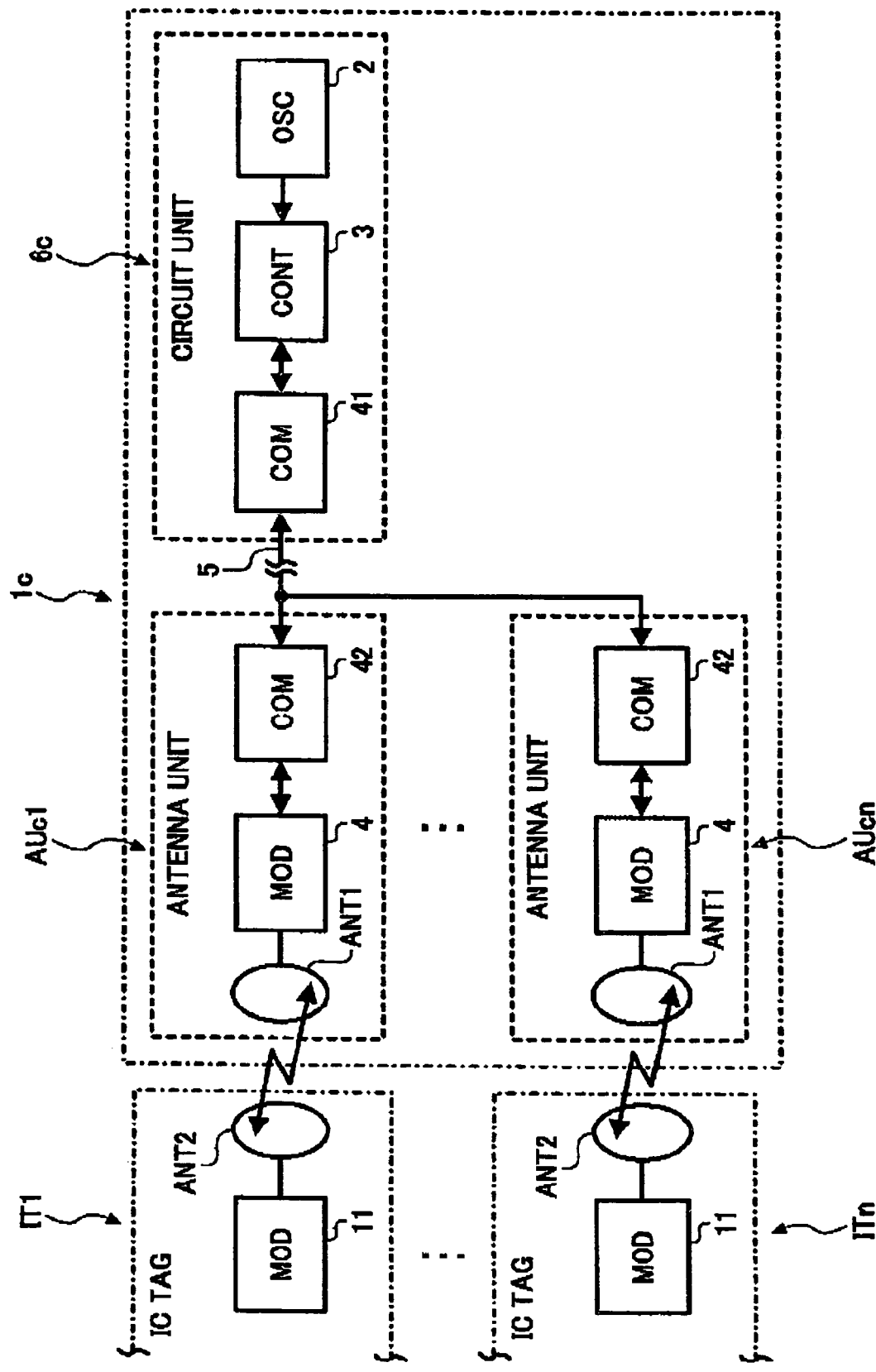

FIG. 7 illustrates an IC-tag read-write apparatus 1c according to another embodiment and also a plurality of IC tags IT1-ITn. As illustrated in FIG. 7, the IC-tag read-write apparatus 1c includes a plurality of antenna units AUc1-AUcn, in which n is a positive integer greater than 1. Each one of the antenna units AUc1-AUcn is equivalent to the antenna unit 7b of FIG. 6, and each one of the IC tags IT1-ITn is equivalent to the IC tag 10 of FIG. 6. The antenna units AUc1-AUcn are operative in combination with the respective IC tags IT1-ITn on a one-to-one basis. Each of the antenna units AUc1-AUcn is connected to the controller 3 via the transmission path 5. The IC-tag read-write apparatus 1c performs the data read and write operation basically in the same manner as the IC-tag read-write apparatus 1.

In the IC-tag read-write apparatus 1c of FIG. 7, each of the antenna units Auc1-AUcn is connected to the communication interface circuit 41 of the circuit unit 6c through the communication interface circuit 42 of the antenna unit 7c and the transmission path 5.

This IC-tag read-write apparatus 1c of FIG. 7 can also be efficiently used in the apparatus 31 of FIG. 5, which can be a digital copier, a printer, or the like, as an alternative to the IC-tag read-write apparatus 21 of FIG. 4. In this case, in FIG. 5, the circuit unit 6c of FIG. 7 replaces the circuit unit 26, the transmission path 5 of FIG. 7 replaces the transmission path 27, and the combinations of the modulation circuit 4 and the communication interface circuit 42 of FIG. 7 the antenna units AUc1 through AUcn in replace the modulation circuits MD1 and MD2.

Figure 8:
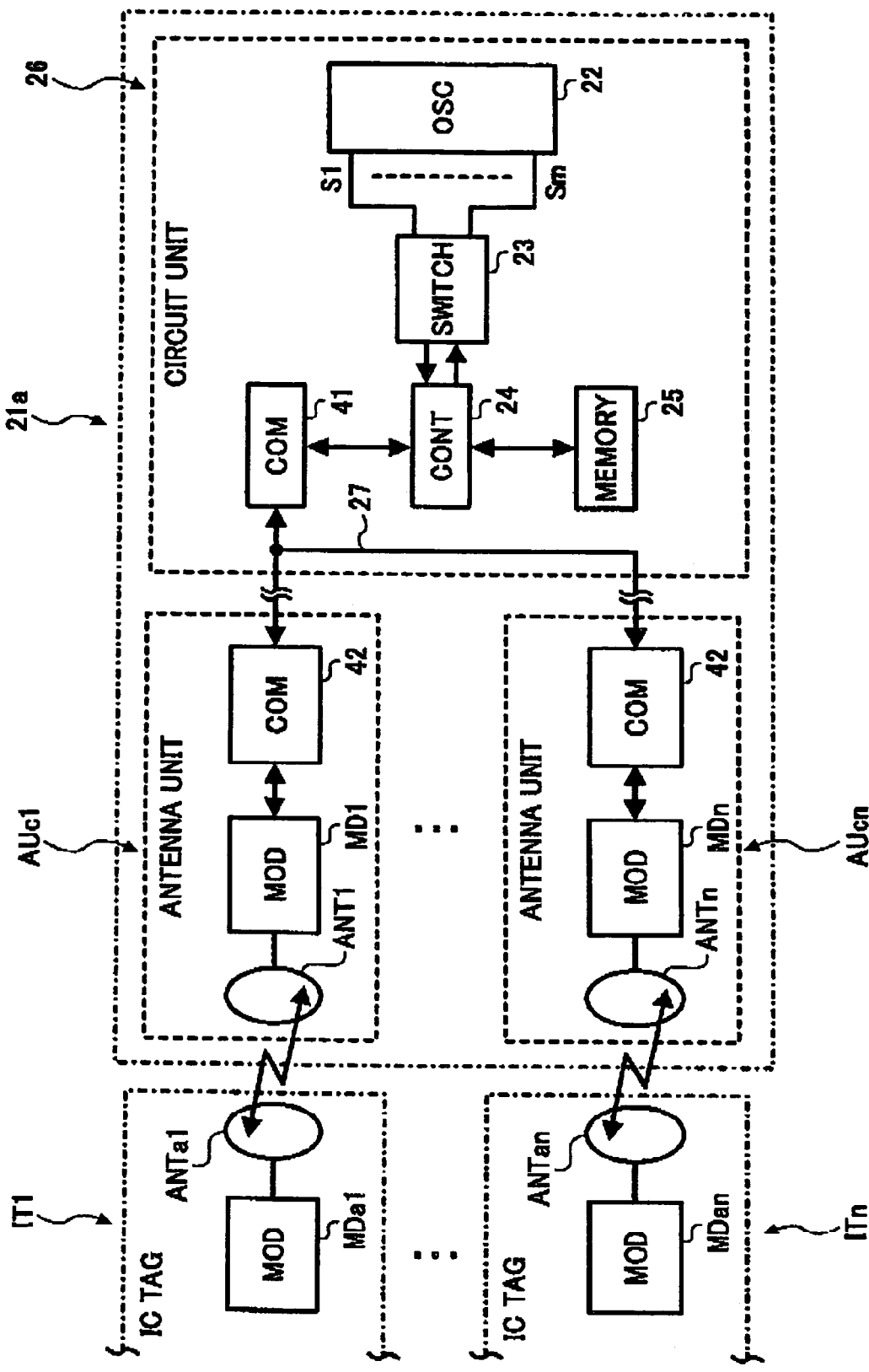

Referring to FIG. 8, an IC-tag read-write apparatus 21a according to another embodiment is explained. The IC-tag read-write apparatus 21a of FIG. 8 is similar to the IC-tag read-write apparatus 21 of FIG. 4, except for the communication interface circuits 41 and 42 which are described above with reference to FIG. 7. In the IC-tag read-write apparatus 21a of FIG. 8, the circuit unit 26 is provided with the communication interface circuit 41 to connect the controller 24 to the transmission path 27. Also, each of the antenna units AUc1-AUcn is provided with the communication interface circuit 42 to connect a corresponding one of the modulation circuits MD1-MDn to the transmission path 27.

With the above-described structure, the physical distance between the antenna units AUc1-AUcn and the circuit unit 26 can be extended and accordingly flexibility of locations for these units can further be increased.

As an alternative, each one of the IC-tag read-write apparatuses 1b, 1c, and 21a is configured to be an asynchronous radio communication system by adding an extra oscillator to each antenna unit.

This IC-tag read-write apparatus 21a of FIG. 8 can also be efficiently used in the apparatus 31 of FIG. 5, which can be a digital copier, a printer, or the like, as an alternative to the IC-tag read-write apparatus 21 of FIG. 4. In this case, the combination of the modulation circuit MD1 and the communication interface circuit 42 of FIG. 8 replace the modulation circuit MD1 of FIG. 5, and the combination of the modulation circuit MD2 and the communication interface circuit 42 of FIG. 8 replace the modulation circuit MD2 of FIG. 5.

Figure 9:
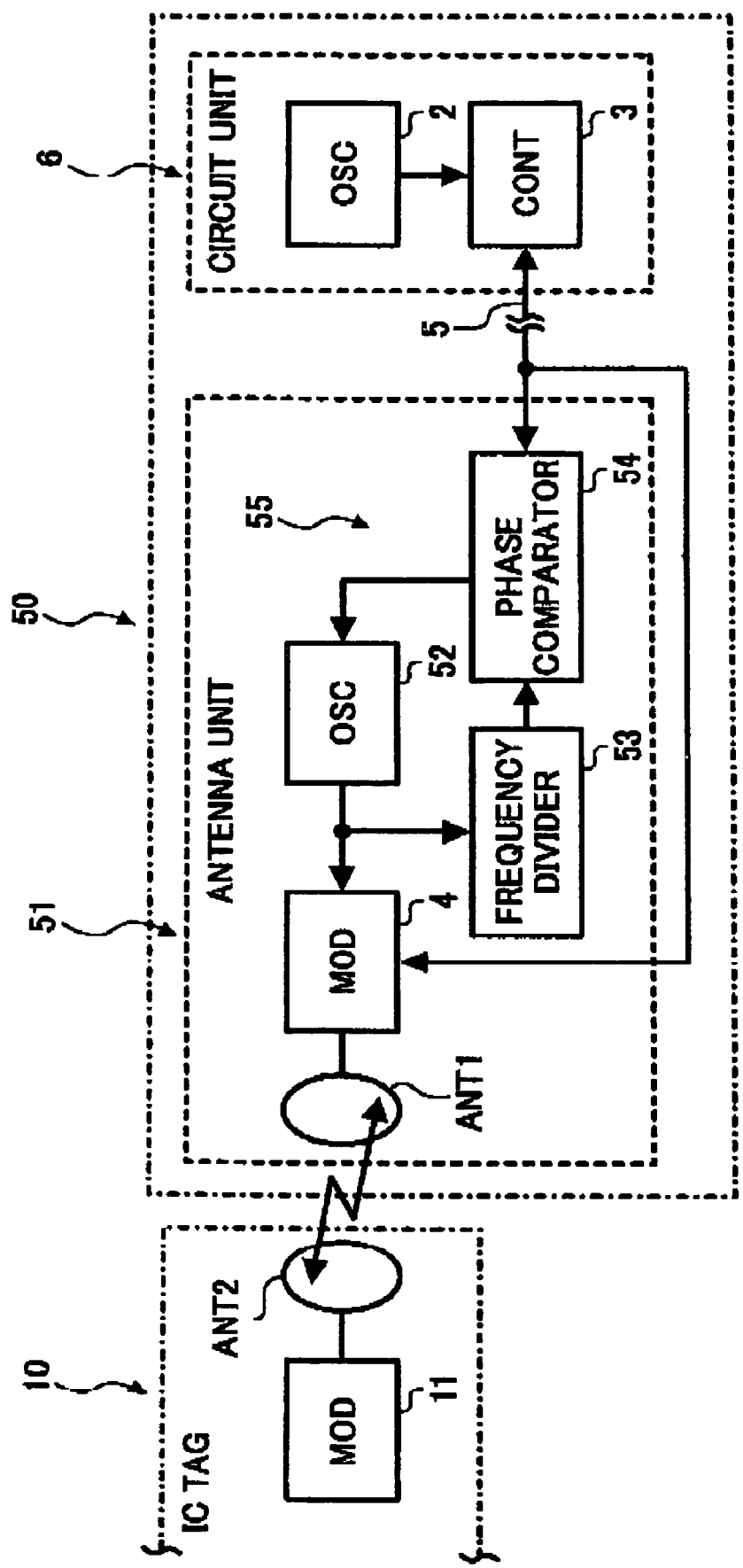
FIGS. 9-12 illustrations of IC-tag read-write apparatuses according to other embodiments for an ultrahigh frequency use.

Referring to FIG. 9, an IC-tag read-write apparatus 50 according to another embodiment is explained. The IC-tag read-write apparatus 50 of FIG. 9 is similar to the IC-tag read-write apparatus 1 of FIG. 2, except for an antenna unit 51 in place of the antenna unit 7 of FIG. 2. The antenna unit 51 of FIG. 9 is similar to the antenna unit 7 of FIG. 2, except for an oscillator 52, a frequency divider 53, and a phase comparator 54. The oscillator 52 generates an oscillating signal to be used in the antenna unit 51. The frequency divider 53 divides the oscillating signal, output from the oscillator 52, with a predetermined frequency division ratio. The phase comparator 54 compares phases of signals input from the frequency divider 53 and the controller 3. The oscillator 52, the frequency divider 53, and the phase comparator 54 form a frequency multiplying circuit 55.

In the antenna unit 51, the phase comparator 54 compares the carrier wave input by the controller 3 of the circuit unit 6 via the transmission path 5 with the signal output from the frequency divider 53 and outputs a signal representing the phase comparison result to the oscillator 52. With the phase comparison result sent from the phase comparator 54, the oscillator 52 adjusts the frequency of its output signal so that the phases of the above-mentioned two signals compared by the phase comparator 54 match with each other. The modulation circuit 4 receives the signal output from the oscillator 52 and regards it as a carrier wave. Further, the modulation circuit 4 performs a predetermined modulation in accordance with the data sent from the controller 3 of the circuit unit 6. The thus-modulated signal is transmitted by radio transmission through the antenna ANT1.

Generally, when the frequency of the communications between the IC-tag read-write apparatus and the IC tag is an ultrahigh frequency such as 900 MHz, 2.45 GHz, etc., a radiation amount of undesired wave is increased, especially from a transmission channel such as a cable connected between the circuit unit and the antenna unit. Such an increased undesired wave may become a source for generating electric noises. Therefore, the transmission channel between the circuit unit and the antenna unit is not easily extended typically with an increase of undesired wave.

With the structure of FIG. 9, however, this problem is solved. That is, the carrier wave output from the controller 3 of the circuit unit 6 can be set to a frequency lower than that of the signal output from the oscillator 52 even when the signal output from the oscillator 52 has an ultrahigh frequency such as 900 MHz, 2.45 GHz, etc. Therefore, the signal which passes through the transmission path 5 is a relatively low-frequency signal, but the carrier wave in communication between the IC-tag read-write apparatus 50 and the IC tag 10 is an ultrahigh frequency signal.

Figure 10:
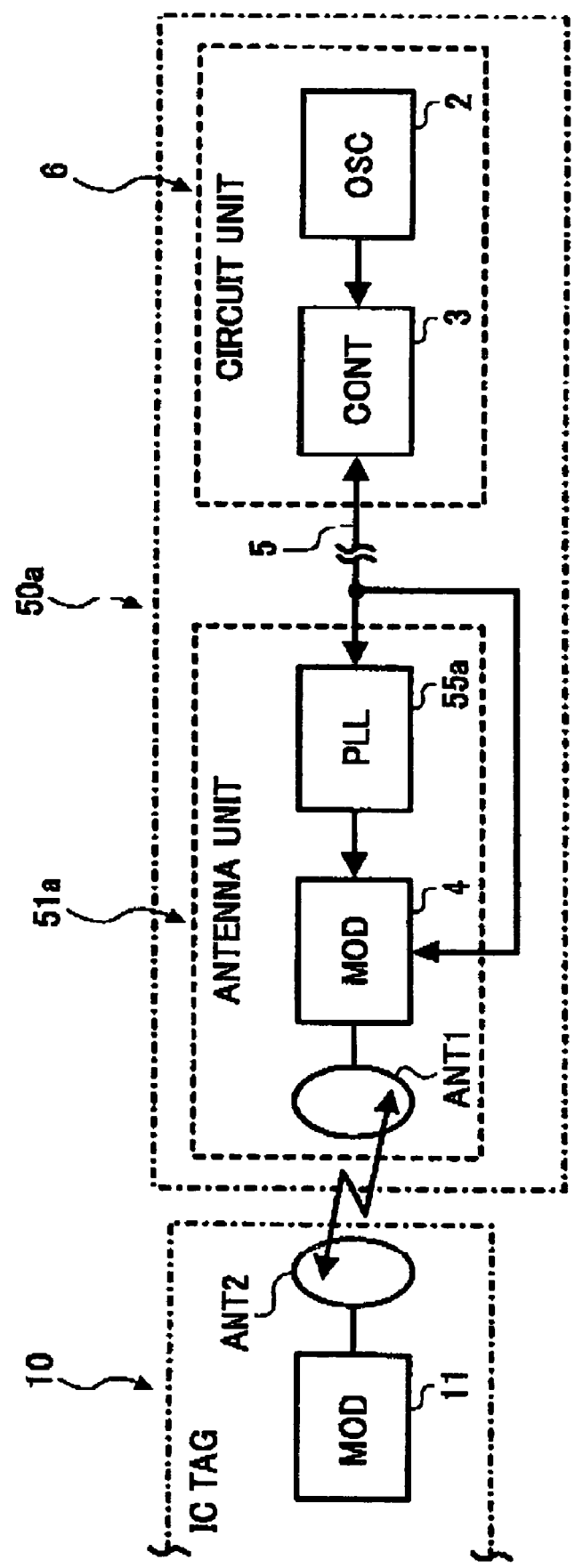

As an alternative to the frequency multiplier 55 of FIG. 9, a PLL (phase locked loop) circuit 55a can be used, as illustrated in FIG. 10. In this case, the IC-tag read-write apparatus 50 is replaced by an IC-tag read-write apparatus 50a and the antenna unit 51 is replaced by an antenna unit 51a. The IC-tag read-write apparatus 50a performs operations similar to what the IC-tag read-write apparatus 50 performs.

As an alternative to the frequency multiplier 55 of FIG. 9, a PLL (phase locked loop) circuit 55a can be used, as illustrated in FIG. 10. In this case, the IC-tag read-write apparatus 50 is renamed an IC-tag read-write apparatus 50a and the antenna unit 51 is renamed an antenna unit 51a. The IC-tag read-write apparatus 50a performs operations similar to what the IC-tag read-write apparatus 50 performs.

As an alternative, the IC-tag read-write apparatus 50 (or 50a) may be provided with a plurality of the antenna units 51 (or 51a) to communicate with a plurality of IC tags.

The IC-tag read-write apparatus 50 (or 50a) can also be efficiently used in the apparatus 31 of FIG. 5, which can be a digital copier, a printer, or the like, as an alternative to the IC-tag read-write apparatus 21 of FIG. 4. In this case, in FIG. 5, the circuit unit 6 replaces the circuit unit 26, the transmission path 5 replaces the transmission path 27, the combination of the modulation circuit 4 and the circuitry including the oscillator 52, the frequency divider 53, and the phrase comparator 54 (or the PLL 55a) replaces the modulation circuit MD1, and the IC tag 10 replaces the IC tag IT1. In addition, in FIG. 5, the antenna unit ANT2, the IC tag IT2, and the modulation circuit MD2 are eliminated.

Figure 11:
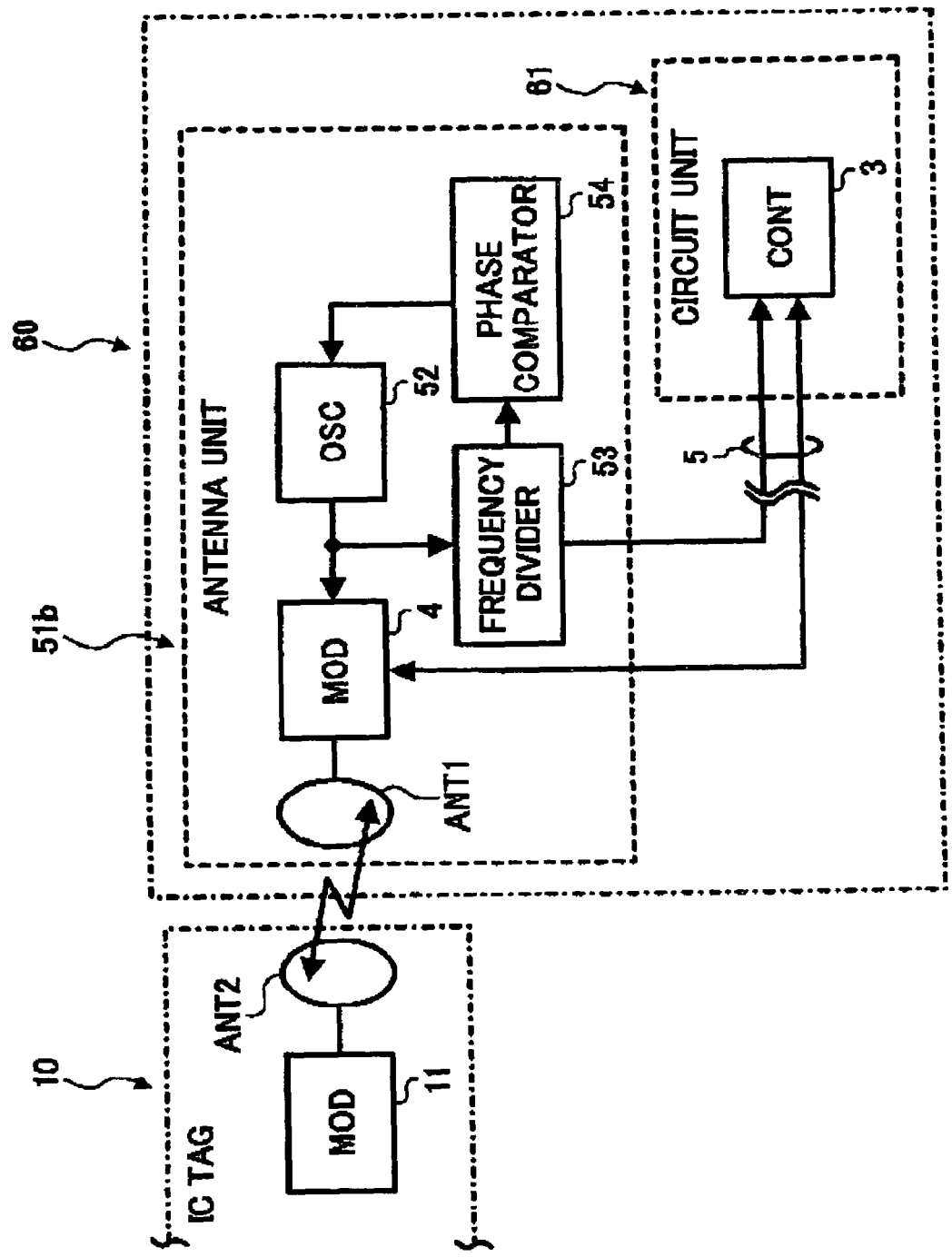

Referring to FIG. 11, an IC-tag read-write apparatus 60 according to another embodiment is explained. The IC-tag read-write apparatus 60 of FIG. 11 is similar to the IC-tag read-write apparatus 50 of FIG. 9, except for the circuits described below. That is, in the IC-tag read-write apparatus 60 of FIG. 11, the oscillator 2 of the circuit unit 6 is omitted, a signal output from the frequency divider 53 is input to the controller 3, and the controller 3 uses this signal input from the frequency divider 53 as a carrier wave. According to these changes, the antenna unit 51 is replaced by an antenna unit 51 b, and the circuit unit 6 is replaced by a circuit unit 61.

In FIG. 11, the oscillator 52 of the antenna unit 51b generates the carrier wave which is subsequently divided by the frequency divider 53 at a predetermined frequency division ratio and is sent to the controller 3. In this process, the divided signal is a lower-frequency signal than the frequency of the carrier wave used for communications with the IC tag 10. The controller 3 uses the divided signal as a carrier wave for transmitting the data signal to the modulation circuit 4 of the antenna unit 51b. In this way, the IC-tag read-write apparatus 60 can transmit the data signal from the circuit unit 61 to the antenna unit 51b with a carrier wave of a lower frequency than the carrier wave used for communications with the IC tag 10. This decreases an amount of undesired wave generated in the transmission path 5 between the antenna unit 51b and the circuit unit 61, resulting in a reduction of electric noises against the circuits inside the IC-tag read-write apparatus 60.

In FIG. 11, the phase comparator 54 includes an oscillating circuit (not shown) for generating a reference-frequency signal.

This IC-tag read-write apparatus 60 can also be efficiently used in the apparatus 31 of FIG. 5, which can be a digital copier, a printer, or the like, as an alternative to the IC-tag read-write apparatus 21 of FIG. 4. In this case, in FIG. 5, the circuit unit 61 replaces the circuit unit 26, the transmission path 5 replaces the transmission path 27, the combination of the modulation circuit 4 and the circuitry including the oscillator 52, the frequency divider 53, and the phrase comparator 54 replaces the modulation circuit MD1, and the IC tag 10 replaces the IC tag IT1. In addition, in FIG. 5, the antenna unit ANT2, the IC tag IT2, and the modulation circuit MD2 are eliminated.

Figure 12:
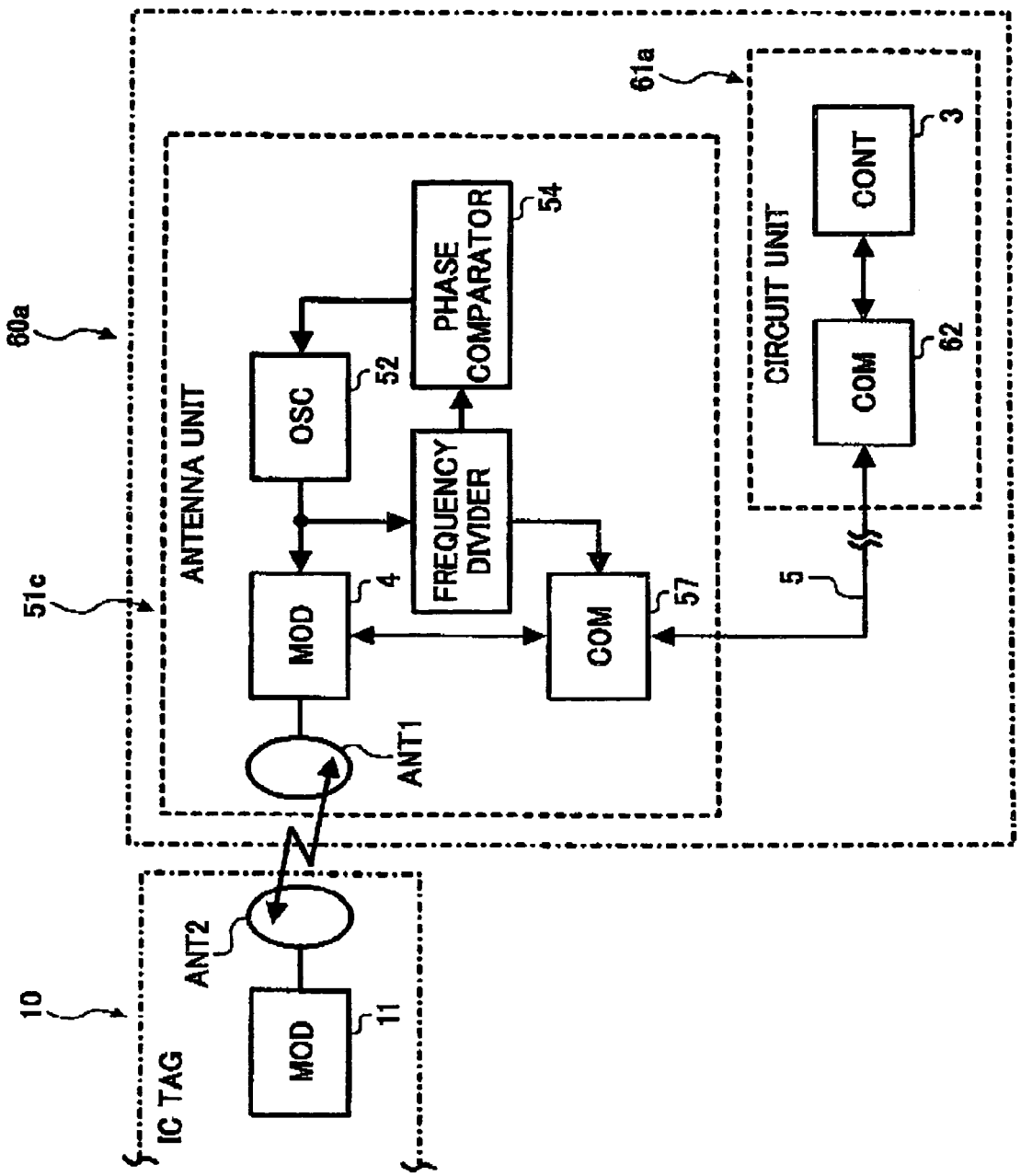

Referring to FIG. 12, an IC-tag read-write apparatus 60a according to another embodiment is explained. The IC-tag read-write apparatus 60b of FIG. 12 is similar to the IC-tag read-write apparatus 9 of FIG. 11, except for communication interface circuits (COM) 57 and 62 provided to an antenna unit 51c and a circuit unit 61a, respectively.

In the IC-tag read-write apparatus 60a of FIG. 12, the circuit unit 61a includes the controller 3 and the communication interface circuit 62. The antenna unit 51c includes the modulation circuit 4, the oscillator 52, the frequency divider 53, the phase comparator 54, the communication interface circuit 57, and the antenna ANT1. The communication interface circuits 57 and 62 provide interface for serial communication between the circuit unit 6a and the antenna unit 51c.

As illustrated in FIG. 12, the communication interface circuit 62 is connected to the controller 3 in the circuit unit 61a and the communication interface circuit 57 is connected to the modulation circuit 4 and the frequency divider 53 in the antenna unit 51c. The communication interface circuits 57 and 62 communicate with each other via the transmission path 5. The frequency-divided signal output from the frequency divider 53 is input to the communication interface circuit 57 and is transmitted to the controller 3 of the circuit unit 61a via the communication interface circuit 62. The controller 3 superimposes transmission data on the thus-received frequency-divided signal and transmits it to the modulation circuit 4 via the communication interface circuits 57 and 62.

The modulation circuit 4 receives the carrier wave from the oscillator 52 and the data signal from the controller 3 through the communication interface circuits 57 and 62 and performs the predetermined modulation to the carrier wave and the data signal. The modulation signal is transmitted from the antenna ANT1 by radio transmission. The modulation circuit 4 also performs the predetermined demodulation to the signal received through the antenna ANT1, thereby obtaining a data signal. The data signal thus received from outside with the ANT1 is sent to the controller 3 through the communication interface circuits 57 and 62 and the transmission path 5.

With the structure described above, the IC-tag read-write apparatus 60a of FIG. 12 can perform serial communications in a steady manner between the circuit unit 61a and the antenna unit 51c.

In this way, the IC-tag read-write apparatus 60a can transmit the data signal from the circuit unit 61a to the antenna unit 51c with a carrier wave of a lower frequency than the carrier wave used for the communications with the IC tag 10. This decreases an amount of undesired wave generated in the transmission path 5 between the antenna unit 51c and the circuit unit 61a, resulting in a reduction of electric noises against the circuits inside the IC-tag read-write apparatus 60a.

As an alternative, the IC-tag read-write apparatus 60a (or 60) may be provided with a plurality of the antenna unit 51c (or 51b) to communicate with a plurality of IC tags.

This IC-tag read-write apparatus 60a of FIG. 12 can also be efficiently used in the apparatus 31 of FIG. 5, which can be a digital copier, a printer, or the like, as an alternative to the IC-tag read-write apparatus 21 of FIG. 4. In this case, in FIG. 5, the circuit unit 61a of FIG. 12 replaces the circuit unit 26, the transmission path 5 of FIG. 12 replaces the transmission path 27, the combination of the modulation circuit 4 and the circuitry including the oscillator 52, the frequency divider 53, the phrase comparator 54, and the communication interface circuit 57 replaces the modulation circuit MD1, and the IC tag 10 replaces the IC tag IT1. In addition, in FIG. 5, the antenna unit ANT2, the IC tag IT2, and the modulation circuit MD2 are eliminated.

Although the above IC-tag read-write apparatuses 1, 1a, 1b, 1c, 21, 21a, 50, 50a, 60, and 60a are described as apparatuses capable of reading and writing IC tags, the embodiment is not limited to them and can be applied to an apparatus having either one of two functions: reading and writing IC tags.

Each of the circuitry included in the antenna units 51, 51a, 51b, and 51c shown in FIGS. 9-12, respectively, can be integrated in a single IC (integrated circuit).

Figure 13:
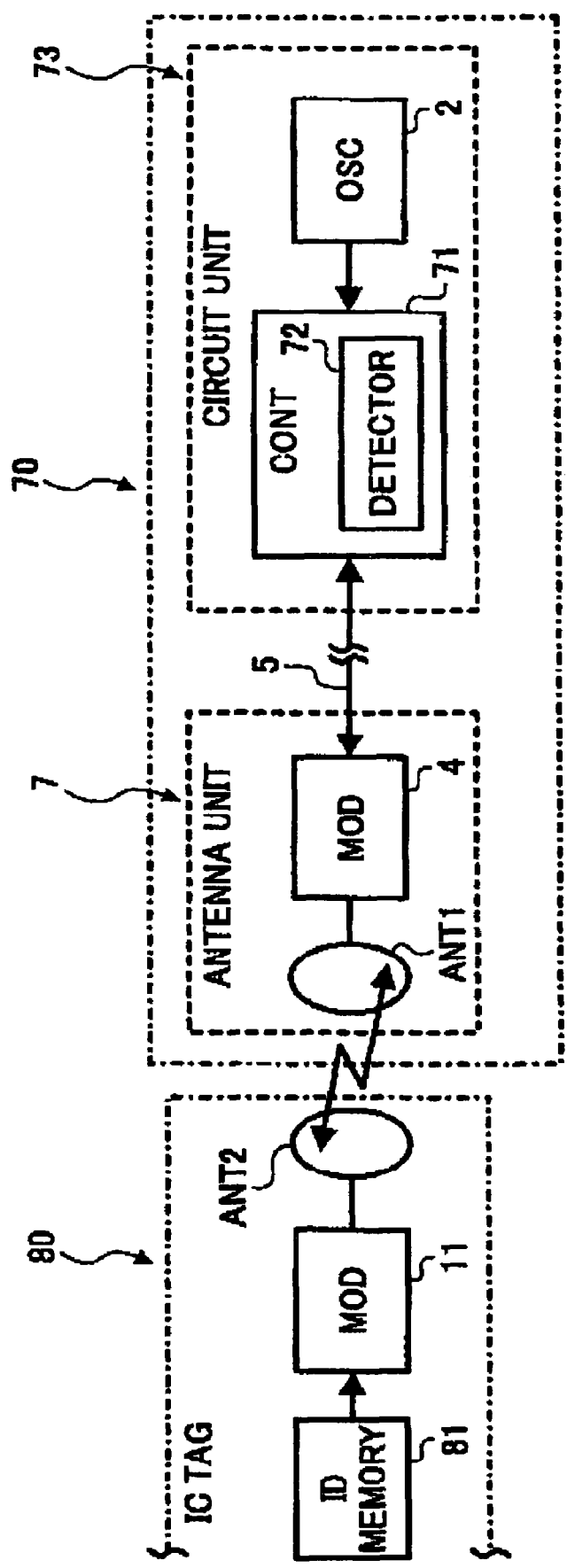
FIG. 13 is an illustration of an IC-tag read-write apparatus according to another embodiment having a plurality of communication modes to communicate with various kinds of IC tags.

Referring to FIG. 13, an IC-tag read-write apparatus 70 according to another embodiment is explained. The IC-tag read-write apparatus 70 of FIG. 13 is similar to the IC-tag read-write apparatus 1 of FIG. 2, except for a circuit unit 73 provided in place of the circuit unit 6 of FIG. 2. The circuit unit 73 of FIG. 13 is similar to the circuit unit 7 of FIG. 2, except for a controller 71 provided in place of the controller 3 of FIG. 2. The controller 71 includes a detector 72. FIG. 13 also illustrates an IC tag 80 which is similar to the IC tag 10, except that the IC tag 80 includes an ID (identification) memory 81.

Generally, in communications with IC tags, an IC-tag read-write apparatus needs to match not only radio wave frequency but also other factors such as a communication data coding method and communication protocols. Problems may not occur when an IC-tag read-write apparatus communicates with an IC tag of which coding method and communication protocols are known to the IC-tag read-write apparatus. However, problems would occur when an IC-tag read-write apparatus communicates with various kinds of IC tags including an IC tag of which coding method and communication protocols are unknown to the IC-tag read-write apparatus. In this case, the IC-tag read-write apparatus needs to analyze and recognize coding method and communication protocols of an unknown IC tag. Furthermore, the IC-tag read-write apparatus needs to match with such unknown IC tag by selecting a suitable IC-tag read-write unit from among a plurality of IC-tag read-write units having different communication modes. From a cost viewpoint, this is expensive. In order to reduce the cost, it is possible to separate circuitry into two circuit portions. A first circuit portion is circuitry not affected by the difference of communication modes and is integrated into a single IC (integrated circuit). A second circuit portion is circuitry affected by the difference of communication modes and is formed by software using a CPU (central processing unit). The IC-tag read-write apparatus 70 of FIG. 13 is an exemplary apparatus implementing this structure.

In FIG. 13, the IC-tag read-write apparatus 70 is configured to communicate with various kinds of IC tags having different communication protocols and includes the circuit unit 73, the antenna unit 7, and the transmission path 5. The circuit unit 73 includes the oscillator 2 for generating a carrier wave having a predetermined frequency and the controller 71 for controlling input and output of a data signal to be superimposed on the carrier wave sent from the oscillator 2. The controller 71 includes the detector 72 for detecting ID information from the data which is received through the antenna ANT1 and is demodulated by the modulation circuit 4. The antenna unit 7 includes the modulation circuit 4 and the antenna ANT1. The circuit unit 73 is formed in one or more IC chips. The IC tag 80 includes the antenna ANT2, the modulation circuit 11, and the ID memory 81 which is connected to the modulation circuit 11 and previously stores the ID information of the IC tag 80.

Figure 14:
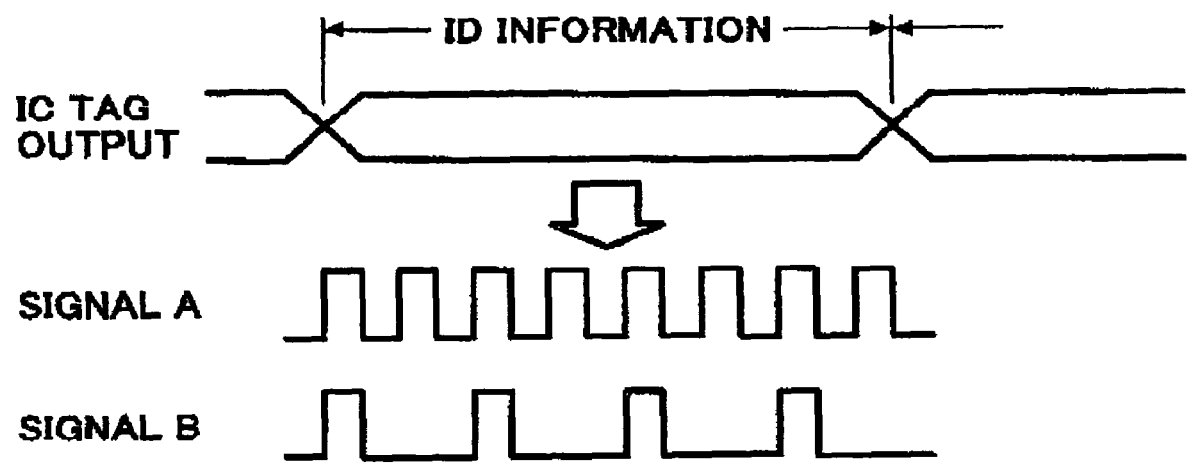
FIG. 14 is a time chart for explaining detection ID information based on incoming data received from an IC tag.

To communicate with the IC tag 80, the IC-tag read-write apparatus 70 allows the controller 71 to transmit through the antenna unit 7 to the IC tag 80 a signal for requesting the IC tag 80 to transmit the ID information stored in the ID memory 81 of the IC tag 80. Upon receiving such a signal from the IC-tag read-write apparatus 70, the IC tag 80 outputs the requested ID information, as shown in FIG. 14. For example, as shown in FIG. 14, the ID information may be a signal A including a predetermined set of 50%-duty pulses or a signal B including a predetermined set of 25%-duty pulses.

It is possible to configure the IC-tag read-write apparatus 70 to allow a user input of coding method and communication protocols when, for example, the ID information of the IC tag is previously known to the user.

It is also possible to previously provide the controller 71 with a plurality of communication modes, that is, a plurality of coding methods and a plurality of communication protocols. The controller 71 attempts to communicate with the IC tag 80 to obtain the ID information by trying the coding methods and the communication protocols in turn. Upon succeeding in the communication, the controller 71 exchanges data with the IC tag 80 by using the successful coding method and communication protocols.

The information transmitted from the IC tag 80 is demodulated by the modulation circuit 4 of the antenna unit 7 in the IC-tag read-write apparatus 70 and is sent to the controller 71 of the circuit unit 73. In the controller 71, the detector 72 detects the ID information of the IC tag 80 from the received information. More specifically, the ID information is first-located information in the information transmitted from the IC tag 80 and, by analyzing such ID information, the detector 72 detects the start point of data shown in FIG. 14. The controller 71 selects the communication mode in accordance with the ID information analyzed by the detector 72 so as to communicate with the IC tag 80. The communication mode, thus selected, includes a data coding method and communication protocols. Most part of mechanisms associated with the communication mode are made by a CPU (central processing unit) and its related components running on software programs. In this way, the IC-tag read-write apparatus 70 can communicate with a number of IC tags having different kinds of communication modes.

Figure 15:
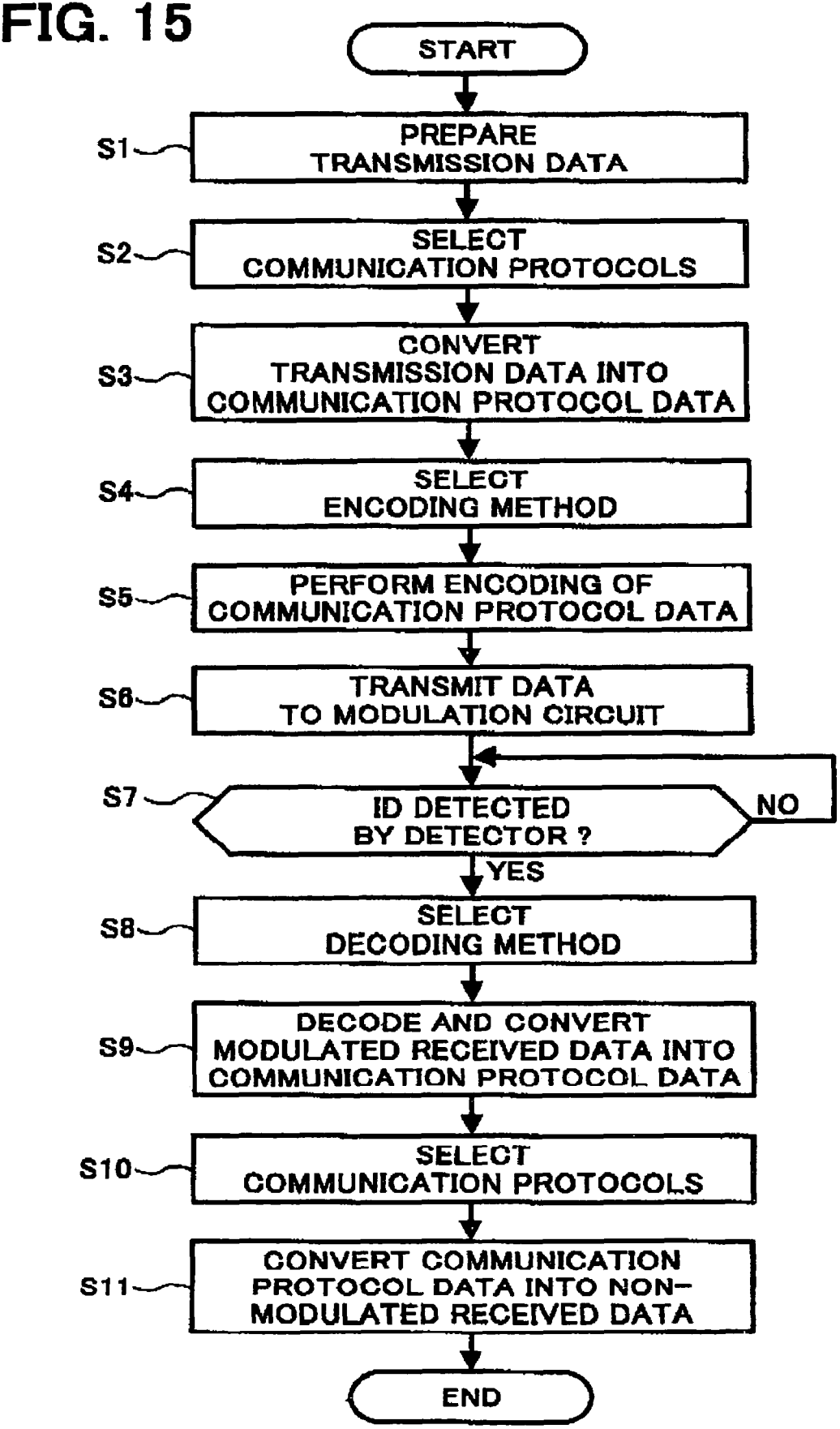
FIG. 15 is a flowchart of an exemplary procedure of a data preparation operation performed by a controller of the IC-tag read-write apparatus of FIG. 13.

Referring to FIG. 15, an exemplary procedure of data communications with the IC tag 80 performed by the IC-tag read-write apparatus 70 is explained. In Step S1 of FIG. 15, the controller 71 prepares for data transmission to the IC tag 80 in response to a data transmission request, for example, from a host system (not shown). In Step S2, the controller 71 selects communication protocols suitable for the IC tag 80 with which the controller 71 starts communicating. In Step S3, the controller 71 converts the transmission data into communication protocol data in accordance with the communication protocols selected in Step S2. In Step S4, the controller 71 selects a coding method suitable for the IC tag 80 with which the controller starts communicating. In Step S5, the controller 71 performs coding of the communication protocol data using the coding method selected in Step S4.

Then, in Step S6, the controller 71 transmits the coded data to the modulation circuit 4. After the data transmission, in Step S7, the controller 71 determines whether the detector 72 has detected ID information of the IC tag 80 from incoming data received through the modulation circuit 4. When the controller 71 determines that the detector 72 has not detected ID information of the IC tag 80 from incoming data received through the modulation circuit 4, the determination result of Step S7 is NO and the determination process is repeated. On the other hand, when the controller 71 determines that the detector 72 detects ID information of the IC tag 80 from incoming data received through the modulation circuit 4, the determination result of Step S7 is YES and the controller 71 recognizes that the data start point is detected and the following data are treated as modulated incoming data. Then, in Step S8, the controller 71 selects a decoding method suitable for the IC tag with which the controller 71 starts communicating. In Step S9, the controller 71 decodes the modulated incoming data using the decoding method selected in Step S8 so as to convert the modulated incoming data into communication protocol data. In Step S10, the controller 71 selects communication protocols suitable for the IC tag with which the controller 71 communicates. In Step S11, the controller 71 converts the communication protocol data into non-modulated received data. Then, the process ends.

The detector 72 of the IC-tag read-write apparatus 70 shown in FIG. 13 can also be implemented into the above IC-tag read-write apparatuses 1, 1a, 1b, 1c, 21, 21a, 50, 50a, 60, and 60a so that these apparatuses 1, 1a, 1b, 1c, 21, 21a, 50, 50a, 60, and 60a can communicate with a number of IC tags having different kinds of communication modes as the IC-tag read-write apparatus 70 does.

Figure 16:
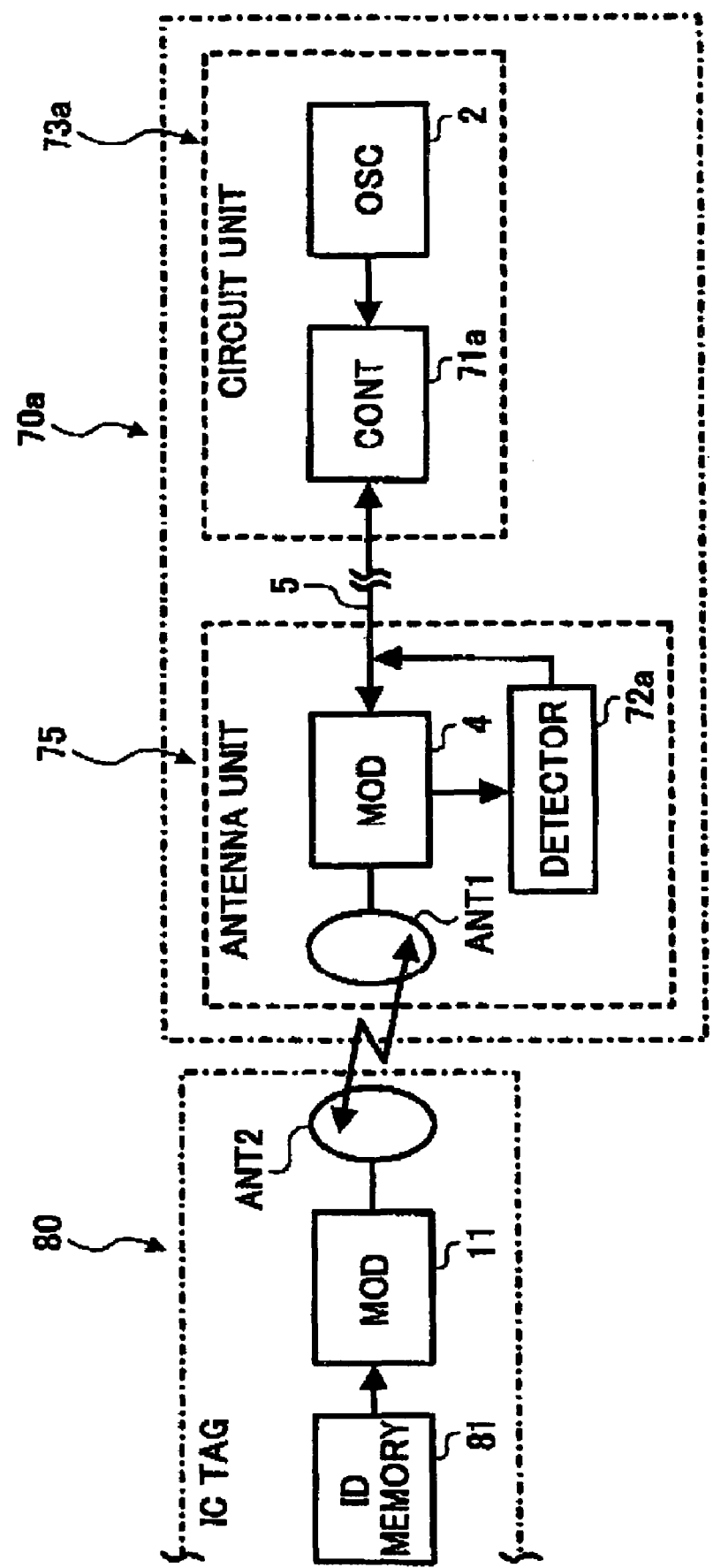
FIG. 16 is an illustration of an IC-tag read-write apparatus according to another embodiment having a plurality of communication modes to communicate with various kinds of IC tags.

As an alternative, the detector 72 can be provided in the antenna unit 7, as illustrated in FIG. 16. In this case, the IC-tag read-write apparatus 70 is replaced by an IC-tag read-write apparatus 70a and the detector 72 is replaced by a detector 72a, as shown in FIG. 16. The IC-tag read-write apparatus 70a of FIG. 16 is similar to the IC-tag read-write apparatus 70, except for a circuit unit 73a and an antenna unit 75. The circuit unit 73a is similar to the circuit unit 73, except for a controller 71a. The antenna unit 75 is similar to the antenna unit 7, except for the above-mentioned detector 72a.

In FIG. 16, the IC-tag read-write apparatus 70a obtains ID information of the IC tag 80 in a manner similar to the IC-tag read-write apparatus 70 of FIG. 13. The ID information sent from the IC tag 80 is demodulated by the modulation circuit 4 of the antenna unit 75 in the IC-tag read-write apparatus 70a, and the demodulated received data is analyzed by the detector 72a. After the analysis, the detector 72a sends the analysis result to the controller 71a of the circuit unit 73a via the transmission path 5. The controller 71a selects a communication mode in accordance with the ID information analyzed by the detector 72a to conduct the communication with the IC tag 80.

The detector 72a and other circuitry of the antenna unit 75 are integrated into a single IC (integrated circuit) chip.

The IC-tag read-write apparatus 70a configured in the above-described way can produce substantially same effects as the IC-tag read-write apparatus 70 does. Also, the circuitry for modulation and demodulation in connection with communication with the IC tag and associated circuits are configured to be integrated into a single IC chip, and the controller is configured to include circuitry relating to the communication mode. Thereby, the integrated circuit used for the antenna unit is considerably flexible and is suitable for mass production. As a result, the manufacturing cost can be reduced. Furthermore, the communication modes are configured by software programs running on a CPU (central processing unit) and its associated components included in the controller, thereby efficiently unifying the controller. As a result, an increase of circuitry size can be suppressed even with an increase of number of communication modes.

Although the above IC-tag read-write apparatuses 70 and 70a are described as apparatuses capable of reading and writing IC tags, the embodiment is not limited to them and can be applied to an apparatus having either one of two functions: reading and writing IC tags.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. 2003-433789 filed on Dec. 26, 2003 and No. 2004-357927 filed on Dec. 10, 2004, in the Japan Patent Office, the entire contents of which are incorporated by reference herein.

What is claimed is:

1. A radio data communication apparatus, comprising;
a circuit unit configured to perform data read and write operations relative to an IC tag; and
at least one antenna unit each configured to have an antenna and to conduct a predetermined signal modulation to a first signal to be transmitted through the antenna by radio transmission to a specific IC tag in the data write operation and a predetermined signal demodulation to a second signal received through the antenna from the specific IC tag in accordance with the data read operation, each one of the at least one antenna unit being arranged at a position separated from the circuit unit,
wherein the circuit unit comprises
an oscillating circuit configured to generate a carrier wave having a specific frequency, and
a control circuit configured to synchronize the carrier wave and a data signal and output the carrier wave and the data signal in synchronism with each other,
wherein the antenna unit comprises
a signal modulation circuit configured to modulate the carrier wave and the data signal with the predetermined signal modulation to generate the first signal to be transmitted through the antenna in the data write operation and to demodulate the second signal received through the antenna in the data read operation.

2. A radio data communication apparatus of claim 1, wherein the antenna unit comprises:
a signal transmitter configured to transmit signals from the antenna unit to the circuit unit,
wherein the circuit unit outputs a data signal and a carrier wave together included in the first signal to the antenna unit in the data write operation and retrieves data from the second signal after the predetermined signal demodulation performed by the antenna unit in the data read operation.

3. A radio data communication apparatus of claim 2, wherein the carrier wave has a specific frequency.

4. A radio data communication apparatus of claim 1,
wherein the oscillating circuit generates a plurality of carrier waves having specific frequencies different from each other,
wherein the circuit unit further comprises a switch circuit configured to exclusively select a specific carrier wave from among the plurality of carrier waves output from the oscillating circuit,
wherein the control circuit synchronizes the specific carrier wave output from the switch circuit and the data signal and outputs the carrier wave and the data signal in synchronism with each other to the signal modulation circuit of the antenna unit, and
wherein the specific carrier wave has a frequency previously set in accordance with a kind of a particular IC tag with which the radio data communication apparatus starts communicating, and the control circuit instructs the switch circuit to exclusively select the specific carrier wave from among the plurality of carrier waves to communicate with the particular IC card.

5. A radio data communication apparatus comprising:
a circuit unit configured to perform data read and write operations relative to an IC tag; and
at least one antenna unit each configured to have an antenna and to conduct a predetermined signal modulation to a first signal to be transmitted through the antenna by radio transmission to a specific IC tag in the data write operation and a predetermined signal demodulation to a second signal received through the antenna from the specific IC tag in accordance with the data read operation, each one of the at least one antenna unit being arranged at a position separated from the circuit unit,
wherein the circuit unit outputs a data signal and a carrier wave together included in the first signal to the antenna unit in the data write operation and retrieves data from the second signal after the predetermined signal demodulation performed by the antenna unit in the data read operation,
wherein the antenna unit comprises:
a signal transmitter configured to transmit signals from the antenna unit to the circuit unit;
an antenna configured to transmit the first signal and receive the second signal;
a frequency multiplication circuit configured to multiply at a predetermined multiplication ratio a frequency of the carrier wave transmitted together with the data signal from the circuit unit; and
a signal modulation circuit configured to modulate the carrier wave output from the frequency multiplication circuit and the data signal with the predetermined signal modulation to generate the first signal to be transmitted through the antenna in the data write operation and to demodulate the second signal received through the antenna in the data read operation.

6. A radio data communication apparatus of claim 5, wherein the frequency multiplication circuit comprises:
an oscillating circuit configured to multiply at the predetermined multiplication ratio the frequency of the carrier wave input from the circuit unit and to output a signal having the multiplied frequency;
a frequency division circuit configured to divide the frequency of the signal output from the oscillating circuit of the antenna unit; and
a phase comparison circuit configured to compare a phase of a signal output from the frequency division circuit with a phase of the carrier wave input from the circuit unit and to output a phase comparison signal representing a result of phase comparison,
wherein the oscillating circuit is configured to adjust the multiplied frequency of the signal output therefrom based on the phase comparison signal such that the phase of the carrier wave output from the circuit unit matches the phase of the frequency division circuit.

7. A radio data communication apparatus of claim 5, wherein the frequency multiplication circuit includes a phase locked loop circuit configured to multiply at a predetermined multiplication ratio the frequency of the carrier wave input from the circuit unit.

8. A radio data communication apparatus of claim 5, wherein the circuit unit is configured to transmit the carrier wave having a predetermined frequency to the frequency multiplication circuit and the data signal to the signal modulation circuit in the data write operation, and to retrieve data from a signal demodulated by the signal modulation circuit of the antenna unit in the data read operation.

9. A radio data communication apparatus of claim 8, wherein the circuit unit comprises:

an oscillating circuit configured to generate the carrier wave having a specific frequency; and a control circuit configured to synchronize the carrier wave output from the oscillating circuit and the data signal, and to transmit the carrier wave to the frequency multiplication circuit and the data signal to the signal modulation circuit.

10. A radio data communication apparatus of claim 2, wherein the antenna unit comprises:

an antenna configured to transmit the first signal and receive the second signal;

an oscillating circuit configured to generate the carrier wave having a specific frequency; and a signal modulation circuit configured to modulate the carrier wave output from the oscillating circuit and the data signal with the predetermined signal modulation to generate the first signal to be transmitted through the antenna in the data write operation and to demodulate the second signal received through the antenna in the data read operation.

11. A radio data communication apparatus of claim 10, wherein the antenna unit further comprises:

a signal generating circuit configured to divide the frequency of the signal output from the oscillating circuit and to transmit the signal having the divided frequency to the control circuit of the circuit unit through the signal transmitter, wherein the control circuit is configured to synchronize the data signal and the signal from the signal generating circuit and to output the synchronized signals to the signal modulation circuit of the antenna unit.

12. A radio data communication apparatus of claim 11, wherein the signal generating circuit is configured to divide the frequency of the signal output from the oscillating circuit at a predetermined frequency division ratio.

13. A radio data communication apparatus of claim 2, wherein the signal transmitter includes a signal transmission path for transmitting a signal.

14. A radio data communication apparatus of claim 2, wherein each of the antenna unit and the circuit unit includes a communication interface circuit for interfacing signal communications between the antenna unit and the circuit unit through the signal transmitter.

15. A radio data communication apparatus of claim 2, wherein the IC tag includes a memory storing identification information of the IC tag, and wherein the circuit unit is further configured to obtain the identification information of the IC tag in a predetermined manner and to conduct signal communications with the IC tag using a communication mode corresponding to the identification information of the IC tag.

16. A radio data communication apparatus of claim 15, wherein the identification information is located at a leading position before data in a data package sent from the IC tag.

17. A radio data communication apparatus of claim 15, wherein the circuit unit is further configured to detect the identification information from the signal received through the antenna unit.

18. A radio data communication apparatus of claim 15, wherein the antenna unit is further configured to detect the identification information from the signal received through the antenna and to transmit the detected identification information to the circuit unit through the signal transmitter.

19. A radio data communication apparatus of claim 15, wherein the circuit unit is further configured to have a plurality of communication modes different from each other, to communicate with the IC tag by in turn selecting a communication mode from among the plurality of communication modes, and to start data communication with the IC tag using a communication mode through which the circuit unit successfully obtains the identification information from the IC tag.

20. A radio data communication apparatus of claim 15, wherein the circuit unit is further configured to have a plurality of communication modes different from each other and to start data communication with the IC tag using a communication mode externally selected.

21. A radio data communication apparatus of claim 1, wherein the IC tag includes a memory storing identification information of the IC tag, and wherein the control circuit is further configured to obtain the identification information of the IC tag in a predetermined manner and to conduct signal communications with the IC tag using a communication mode corresponding to the identification information of the IC tag.

22. A radio data communication apparatus of claim 21, wherein the identification information is transmitted immediately before data from the IC tag.

23. A radio data communication apparatus of claim 21, wherein the control circuit is further configured to detect the identification information from the signal received through the antenna unit.

24. A radio data communication apparatus of claim 21, wherein the antenna unit is further configured to detect the identification information from the signal received through the antenna and to transmit the detected identification information to the control-circuit through the signal transmitter.

25. A radio data communication apparatus of claim 21, wherein the control circuit is further configured to have a plurality of communication modes different from each other, to communicate with the IC tag by in turn selecting a communication mode from among the plurality of communication modes, and to start data communication through the IC tag using a communication mode with which the control circuit successfully obtains the identification information from the IC tag.

26. A radio data communication apparatus of claim 21, wherein the control circuit is further configured to have a plurality of communication modes different from each other and to start data communication with the IC tag using a communication mode externally selected.

27. A radio data communication apparatus of claim 15, wherein the communication mode includes a coding method and communication protocols.

28. A radio data communication apparatus of claim 15, wherein selective operations in the communication mode are operated by software programs.

29. A radio data communication apparatus of claim 1, wherein the signal modulation circuit is integrated in a single integrated circuit chip.

30. A radio data communication apparatus of claim 5, wherein the frequency multiplication circuit and the signal modulation circuit are integrated in a single integrated circuit chip.

31. A radio data communication apparatus of claim 10, wherein the oscillating circuit and the signal modulation circuit are integrated in a single integrated circuit chip.

32. A radio data communication apparatus of claim 15, wherein the signal transmitter includes a signal transmission path for transmitting a signal.

33. A radio data communication apparatus of claim 15, wherein each of the antenna unit and the circuit unit includes a communication interface circuit for interfacing signal communications between the antenna unit and the circuit unit through the signal transmitter.

34. An apparatus comprising:
   a function component configured to perform a predetermined function and provided with an IC tag; and
   a radio data communication unit comprising:
      a circuit unit configured to perform data read and write operations relative to the IC tag; and
      an antenna unit configured to have an antenna and to conduct a predetermined signal modulation to a first signal to be transmitted through the antenna by radio transmission to a specific IC tag in the data write operation and a predetermined signal demodulation to a second signal received through the antenna from the specific IC tag in accordance with the data read operation, the antenna unit being arranged at a position separated from the control circuit,
   wherein the circuit unit comprises
      an oscillating circuit configured to generate a carrier wave having a specific frequency, and
      a control circuit configured to synchronize the carrier wave and a data signal and output the carrier wave and the data signal in synchronism with each other,
   wherein the antenna unit comprises
      a signal modulation circuit configured to modulate the carrier wave and the data signal with the predetermined signal modulation to generate the first signal to be transmitted through the antenna in the data write operation and to demodulate the second signal received through the antenna in the data read operation.

35. An apparatus of claim 34, wherein the radio data communication unit further comprises:
   a signal transmitter configured to transmit signals between the circuit unit and the antenna unit,
   wherein the circuit unit outputs a data signal and a carrier wave together included in the first signal to the antenna unit in the data write operation and retrieves data from the second signal after the predetermined signal demodulation performed by the antenna unit in the data read operation.

36. An apparatus of claim 35, wherein the antenna unit of the radio data communication unit is mounted to the function component.

* * * * *